(12) United States Patent
Swope et al.

(10) Patent No.: US 11,240,344 B2
(45) Date of Patent: Feb. 1, 2022

(54) INTEGRATION OF REMOTE SOFTWARE APPLICATIONS INTO A WORKFLOW

(71) Applicant: ServiceNow, Inc., Santa Clara, CA (US)

(72) Inventors: Stuart Dean Swope, San Diego, CA (US); David Tamjidi, San Diego, CA (US); Azfar Syed Kazmi, San Diego, CA (US); Christopher Maloy, Payson, UT (US); Rebecca Anita Dias, Seattle, WA (US)

(73) Assignee: ServiceNow, Inc., Santa Clara, CA (US)

( * ) Notice: Subject to any disclaimer, the term of this patent is extended or adjusted under 35 U.S.C. 154(b) by 144 days.

(21) Appl. No.: 16/434,071

(22) Filed: Jun. 6, 2019

(65) Prior Publication Data

US 2020/0389543 A1    Dec. 10, 2020

(51) Int. Cl.
*H04L 29/08* (2006.01)
*G06F 8/36* (2018.01)
*G06F 9/54* (2006.01)

(52) U.S. Cl.
CPC .............. *H04L 67/34* (2013.01); *H04L 67/20* (2013.01); *G06F 8/36* (2013.01); *G06F 9/547* (2013.01);
(Continued)

(58) Field of Classification Search
CPC . H04L 67/34; H04L 67/20; G06F 2209/5017; G06F 2209/547; G06F 2209/549; G06F 8/36; G06F 9/547
See application file for complete search history.

(56) References Cited

U.S. PATENT DOCUMENTS 7,062,683 B2   6/2006   Warpenburg
7,610,512 B2   10/2009  Gerber
(Continued)

OTHER PUBLICATIONS

Smartbear Software, What is OpenAPI?, About Swagger Specification, Retrieved on Mar. 14, 2019, 1 Page, https://swagger.io/docs/specification/about/.
(Continued)

*Primary Examiner* — Philip J Chea
*Assistant Examiner* — Ruth Solomon
(74) *Attorney, Agent, or Firm* — Fletcher Yoder PC

(57) ABSTRACT

A system includes persistent storage configured to store definitions of interfaces of remote software applications, and a software application configured to define the interfaces. The software application identifies a remote software application system by which the remote software applications are exposed for execution, and obtains therefrom a specification of a particular remote software application. The software application determines, based on the specification, (i) objects accessible by way of the particular remote software application and (ii) functions invokable to interact with the objects. The software application generates actions that define an interface for the particular remote software application. Each action is configured to invoke execution of one or more of the functions by transmitting a request to the remote software application system and, in response, receive, by way of the remote software application system, an output of the one or more of the functions. The actions are stored in the persistent storage to define the interface.

20 Claims, 27 Drawing Sheets

(52) U.S. Cl.
CPC .............. *G06F 2209/5017* (2013.01); *G06F 2209/547* (2013.01); *G06F 2209/549* (2013.01)

(56) References Cited

U.S. PATENT DOCUMENTS

| | | |
|---|---|---|
| 7,617,073 B2 | 11/2009 | Trinon |
| 7,890,802 B2 | 2/2011 | Gerber |
| 7,945,860 B2 | 5/2011 | Vambenepe |
| 7,966,398 B2 | 6/2011 | Wiles |
| 8,224,683 B2 | 7/2012 | Manos |
| 8,674,992 B2 | 3/2014 | Poston |
| 9,424,112 B1 | 8/2016 | Malamut et al. |
| 9,823,950 B1 | 11/2017 | Carrier et al. |
| 10,554,817 B1* | 2/2020 | Sullivan ............... G06N 5/02 |
| 10,733,557 B2* | 8/2020 | Gray-Donald ........ G06F 9/5083 |
| 2015/0095923 A1 | 4/2015 | Sarid |
| 2016/0019102 A1 | 1/2016 | Cui et al. |
| 2016/0132805 A1* | 5/2016 | Delacourt ................ G06F 8/71 705/7.23 |
| 2017/0289170 A1* | 10/2017 | Stuntebeck ........... H04W 12/08 |
| 2018/0041588 A1* | 2/2018 | Straub ................ G06F 9/45529 |
| 2018/0285794 A1* | 10/2018 | Gray-Donald ........ G06F 9/5038 |
| 2019/0132381 A1* | 5/2019 | Momchilov .............. G06F 3/01 |
| 2020/0051189 A1* | 2/2020 | Williams .............. H04W 4/029 |
| 2020/0186445 A1* | 6/2020 | Govindaraju ....... H04L 41/5029 |

OTHER PUBLICATIONS

W3c et al.: "web Services Description Language (WSDL) Version 2.0 Part 1: Core Language Editors", Jun. 26, 2007, XP055734554 (retrieved from the internet: https://www.w3.org/TR/wsdl20/wsdl20.pdf); 103 pgs.

International Search Report and Written Opinion for PCT Application No. PCT/US2020/036214 dated Oct. 9, 2020; 16 pgs.

* cited by examiner

| Offboarding | Status: Draft | App: User Management | Edit | Test | Copy | Save | Activate |

| Action | | State | Start time | Duration |
|---|---|---|---|---|
| 1. Look up records in [sc_request] when requested for is Trigger->[sys_user] Record | | Complete | 09:08:15 | 120ms |
| 2. For each item in 1->[sc_request] Records | | Complete | 09:08:15 | 2195ms |
| 2.1. Update 2->[sc_request] Record (Request state->"Closed cancelled, Comments->"User no longer with company") | | Complete | 09:08:16 | 796ms |
| Action | 3. Look up records in [task] when assigned to is Trigger->[sys_user] Record | Complete | 09:08:17 | 43ms |
| 4. For each item in 3->[task] Records | | Complete | 09:08:17 | 338ms |
| 4.1. Update 4->[task] Record (Assigned to->Trigger->[sys_user]->Manager) | | Complete | 09:08:17 | 70ms |

```
1.  OPENAPI: 3.0.0                                                              800
2.  INFO:
3.    TITLE: AVAILABLE REMOTE APPLICATIONS
4.    DESCRIPTION: SPECIFIES REMOTE APPLICATIONS EXPOSED FOR EXECUTION BY THE
5.    REMOTE APPLICATION SYSTEM
6.    VERSION: 1.0.5
7.
8.  SERVERS:
9.    - URL: HTTP://APP_1.REMOTE_APPLICATION_SYSTEM.COM
10.   DESCRIPTION: SERVER FOR APPLICATION 1
11.   - URL: HTTP://APP_2.REMOTE_APPLICATION_ SYSTEM.COM
12.   DESCRIPTION: SERVER FOR APPLICATION 2
13.   ...
14.   - URL: HTTP://REMOTE_APPLICATION_SYSTEM.COM/APP_10
15.   DESCRIPTION: SERVER FOR APPLICATION 10
```

FIG. 8A

```
1.   OPENAPI: 3.0.0                                                                    802
2.   INFO:
3.     TITLE: APPLICATION 1 FUNCTIONS
4.     DESCRIPTION: SPECIFIES THE FUNCTIONS OF APPLICATION 1 THAT CAN BE EXECUTED
5.     BY WAY OF THE REMOTE SOFTWARE APPLICATION SYSTEM.
6.
7.   SERVERS:
8.     - URL: HTTP://APP_1.REMOTE_APPLICATION_SYSTEM.COM
9.       DESCRIPTION: SERVER FOR APPLICATION 1
10.
11.  PATHS:
12.    /FUNCTION_1/{INPUT_1}:
13.      GET:
14.        SUMMARY: EXECUTES FUNCTION_1 OF APPLICATION 1
15.        PARAMETERS:
16.          - IN: PATH
17.            NAME: INPUT_1
18.            REQUIRED: TRUE
19.            DESCRIPTION: INPUT FOR FUNCTION_1.
20.            SCHEMA:
21.              TYPE: INTEGER
22.              MINIMUM: 1
23.        RESPONSES:
24.          '200':
25.            DESCRIPTION: A VALID OUTPUT IS RETURNED.
26.            CONTENT:
27.              APPLICATION/JSON:
28.                SCHEMA:
29.                  TYPE: OBJECT
30.                  PROPERTIES:
31.                    OUTPUT_1:
32.                      TYPE: INTEGER
33.                    OUTPUT_2:
34.                      TYPE: STRING
35.                    OUTPUT_3:
36.                      TYPE: STRING
37.          '404':
38.            DESCRIPTION: AN OUTPUT IS NOT AVAILABLE.
```

FIG. 8B

```
1.   /FUNCTION_2/{INPUT_2}/{INPUT_3}:                                    804
2.     GET:
3.       SUMMARY: EXECUTES FUNCTION_2 OF APPLICATION 1
4.       PARAMETERS:
5.         - IN: PATH
6.           NAME: INPUT_2
7.           REQUIRED: TRUE
8.           DESCRIPTION: FIRST INPUT FOR FUNCTION_2.
9.           SCHEMA:
10.            TYPE: INTEGER
11.          NAME: INPUT_3
12.          REQUIRED: FALSE
13.          DESCRIPTION: SECOND INPUT FOR FUNCTION_2.
14.          SCHEMA:
15.            TYPE: STRING
16.        - IN: QUERY
17.          NAME: INPUT_4
18.          SCHEMA:
19.            TYPE: STRING
20.          DESCRIPTION: THIRD INPUT FOR FUNCTION_2
21.          NAME: INPUT_5
22.          REQUIRED: FALSE
23.          SCHEMA:
24.            TYPE: INTEGER
25.            DEFAULT: 20
26.          DESCRIPTION: FOURTH INPUT FOR FUNCTION_2
27.      RESPONSES:
28.        ...
```

FIG. 8C

```
1.  /FUNCTION_3/{INPUT_6}:                                                    806
2.    GET:
3.      SUMMARY: EXECUTES FUNCTION_3 OF APPLICATION 1
4.      PARAMETERS:
5.        - IN: PATH
6.          NAME: INPUT_6
7.          REQUIRED: TRUE
8.          DESCRIPTION: FIRST INPUT FOR FUNCTION_3.
9.          SCHEMA:
10.            TYPE: INTEGER
11.        - IN: HEADER
12.          NAME: INPUT_7
13.          SCHEMA:
14.            TYPE: STRING
15.            FORMAT: UUID
16.          REQUIRED: TRUE
17.        - IN: COOKIE
18.          NAME: INPUT_8
19.          SCHEMA:
20.            TYPE: INTEGER
21.            ENUM: [0, 1]
22.            DEFAULT: 0
23.      RESPONSES:
24.        ...
```

FIG. 8D

```
 1.   /FUNCTION_4:                                                    808
 2.      ...
 3.      RESPONSES:
 4.        '200':
 5.          DESCRIPTION: AN OBJECT ACCESSED BY THE FUNCTION IS RETURNED
 6.          CONTENT:
 7.            APPLICATION/JSON:
 8.              SCHEMA:
 9.                $REF: '#COMPONENTS/SCHEMAS/OBJECT_4'
10.  ...
11.
12. COMPONENTS:
13.   SCHEMAS:
14.     OBJECT_4:
15.       TYPE: OBJECT
16.       PROPERTIES:
17.         FIELD_1:
18.           TYPE: INTEGER
19.         FIELD_2:
20.           TYPE: STRING
21.         FIELD_3:
22.           TYPE: INTEGER
23.       OBJECT_5:
24.         ...
```

FIG. 8E

INTEGRATION OF REMOTE SOFTWARE APPLICATIONS INTO A WORKFLOW

BACKGROUND

An application programming interface (API) provides a set of functions and associated communication protocols for building software. The functions provided by the API may be used by many different computing systems, especially when the API is accessible by way of a computer network. That is, the computing systems may utilize the API's functions rather than implementing separate, new versions of these functions. APIs generally provide clearly defined protocols, standards, and/or rules for interacting with the functions provided thereby. Thus, a computing system that utilizes the functions of an API may adhere to the protocols, standards, and rules specific to a particular API. By adhering to these rules, the computing system may invoke the functions of the API in a predefined manner and, in response, may receive output of the functions formatted in a specific, predictable fashion.

SUMMARY

A software-based workflow design tool may enable the definition and execution of workflows, which are specific sequences or series of tasks that, when performed, accomplish one or more goals. The workflow design tool may provide a graphical user interface by way of which the workflows may be defined with little to no writing of computer program code. Each workflow may include, among other elements, one or more actions configured to perform specific operations. Actions may be defined for integration into workflows using a software-based action design tool.

The software-based action design tool may allow actions to be defined that interact with and utilize objects and/or functions provided by one or more remote software applications. These remote software applications may be developed and hosted by third-party computing systems different from the computing systems that execute the workflow (e.g., a remote network management platform) and/or the computing systems on whose behalf the workflows are executed (e.g., a managed network). A plurality of actions that interact with objects and/or functions of a particular remote software application may collectively define an interface for the particular remote software application. This interface may alternatively be referred to as a spoke or an integration connector. Such actions may allow an enterprise to take advantage of the computational resources provided by the remote software applications by integrating the objects and/or functions of these remote software applications into the enterprise's workflows.

Interaction between workflows and the remote software applications may be facilitated by a remote software application system. The computing system that executes the workflow, the remote software application system, and the computing systems that execute the remote software applications may each be physically separate and distinct systems. The remote software application system may serve as an intermediary between the computing system that executes the workflow and the computing systems that execute the remote software applications. Thus, the workflow may transmit, to the remote application system, a request for execution of certain functions provided by the remote software applications. The remote application system may, in turn, request execution of these certain functions from the remote software applications. Output of the functions may similarly be provided by the remote applications to the workflow by way of the remote software application system.

Notably, some of the remote software applications may differ from one another in their adherence to different sets of standards, processes, and/or rules for interacting therewith. Accordingly, actions that interact directly with the remote software applications may need to adhere to these standards, processes, and/or rules to effectuate successful communication and interaction therewith. Thus, each action that directly communicates with a remote software application may be implemented in an application-specific fashion that accounts for the intricacies of a particular remote software application. Defining actions in this manner may be time-consuming, especially where documentation of the standards, processes, and/or rules is unavailable, lacking, or otherwise deficient. The remote software application system, however, may provide APIs that account for the standards, processes, and/or rules of individual remote software applications and expose standardized and/or uniform interfaces that workflows can use to communicate with the remote software applications.

In one example, the remote software application system may provide a corresponding API for each remote software application of a plurality of remote software applications exposed by the remote software application system. Each API may include API functions that, when executed, invoke execution of corresponding functions of the remote software application. Namely, the remote software application system may produce a request for execution of a particular function thereof. The remote software application system may also receive the output of the function on behalf of the workflow, and pass this output back to the workflow. Thus, by communicating with the API of the remote software application system and requesting execution of a particular API function thereof, a workflow may invoke execution of a corresponding function of the remote software application. Notably, in doing so, the workflow may adhere to the standards associated with the API of the remote software application system, but might not adhere to standards of the corresponding remote software application. Since the APIs of the remote software application system may be standardized, developing interfaces that utilize these APIs may be easier than developing interfaces that communicate directly with the remote software applications.

Additionally, the remote software application system may provide, for each API thereof, a corresponding specification that defines the attributes of the API. Namely, the specification may define the objects accessible by way of the API, the functions invokable by way of the API, the inputs for these functions, and the output of these functions, among other possible attributes. These specifications may be obtained, parsed, and used by the software-based action design tool to automatically generate the actions that make up the interfaces for a plurality of remote software applications.

Each action of an interface may be configured to receive input values for a function of the remote software application, generate and transmit, to the API of the remote software application system, a request that includes therein the input values, receive a response from the API, identify output values of the function in the response, and expose the output values to other actions via output variables.

The software-based action design tool may also be configured to identify service identifiers (e.g., service accounts) usable by workflows to interact with the objects and functions of the remote software applications. Each respective service identifier may be associated with a corresponding scope that defines the objects and/or functions accessible using the respective service identifier. The software-based action design tool may also allow individual actions of an interface to be activated, such that they are available for integration into workflows, deactivated, such that they are not available for integration into workflows, or activated in a context-specific fashion, such that they are available only for some types of workflows (e.g., those using a particular service identifier).

The software-based action design tool may keep the interfaces for the remote software applications up to date. In one implementation, the software-based action design tool may periodically obtain updated version of the specifications and update the interfaces to reflect any changes made thereto. In another implementation, the software-based action design tool may update a particular interface each time an action thereof is requested to be integrated into a workflow. Namely, after a definition of an action of the interface is requested by the software-based workflow design tool, but before this definition is provided thereto, the software-based action design tool may obtain an updated specification for that interface and update the interface in accordance with any changes. Thus, the software-based workflow design tool may be provided with the revised definition for integration into the workflow, allowing workflows to utilize current versions of the actions.

Accordingly, a first example embodiment involves a system that includes (i) persistent storage configured to store definitions of respective interfaces of remote software applications for integration into workflows, (ii) one or more processors, and (iii) an action design software application configured to define the respective interfaces. The action design software application is configured to perform, by way of the one or more processors, operations that include identifying a remote software application system by way of which the remote software applications are exposed for execution. The operations also include obtaining, from the remote software application system, a specification that defines attributes of a particular remote software application of the remote software applications. The operations additionally include determining, based on the specification, (i) one or more objects accessible by way of the particular remote software application and (ii) a plurality of functions of the particular remote software application invokable to interact with the one or more objects. The operations further include generating a plurality of actions that define an interface for the particular remote software application. Each respective action of the plurality of actions is configured to, when executed, (i) invoke execution of one or more corresponding functions of the plurality of functions by transmitting a request to the remote software application system and (ii) receive, in response to the request and by way of the remote software application system, an output of the one or more corresponding functions. The operations yet further include storing, in the persistent storage, the plurality of actions to define the interface.

A second example embodiment involves identifying, by an action design software application configured to define respective interfaces of remote software applications for integration into workflows, a remote software application system by way of which the remote software applications are exposed for execution. Persistent storage is configured to store definitions of the respective interfaces. The second example embodiment also involves obtaining, by the action design software application and from the remote software application system, a specification that defines attributes of a particular remote software application of the remote software applications. The second example embodiment additionally involves determining, by the action design software application and based on the specification, (i) one or more objects accessible by way of the particular remote software application and (ii) a plurality of functions of the particular remote software application invokable to interact with the one or more objects. The second example embodiment further involves generating, by the action design software application, a plurality of actions that define an interface for the particular remote software application. Each respective action of the plurality of actions is configured to, when executed, (i) invoke execution of one or more corresponding functions of the plurality of functions by transmitting a request to the remote software application system and (ii) receive, in response to the request and by way of the remote software application system, an output of the one or more corresponding functions. The second example embodiment yet further involves storing, in the persistent storage, the plurality of actions to define the interface.

In a third example embodiment, an article of manufacture may include a non-transitory computer-readable medium, having stored thereon program instructions that, upon execution by a computing system, cause the computing system to perform operations in accordance with the first example embodiment and/or the second example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment and/or the second example embodiment.

In a fifth example embodiment, a system may include various means for carrying out each of the operations of the first example embodiment and/or the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 6A, 6B, 6C, 6D, 6E, 6F, 6G, 6H, 6I, 6J, and 6K depict workflow design tool graphical user interfaces, in accordance with example embodiments.

FIGS. 8A, 8B, 8C, 8D, and 8E depict excerpts of an API specification, in accordance with example embodiments.

DETAILED DESCRIPTION

Figure 1:
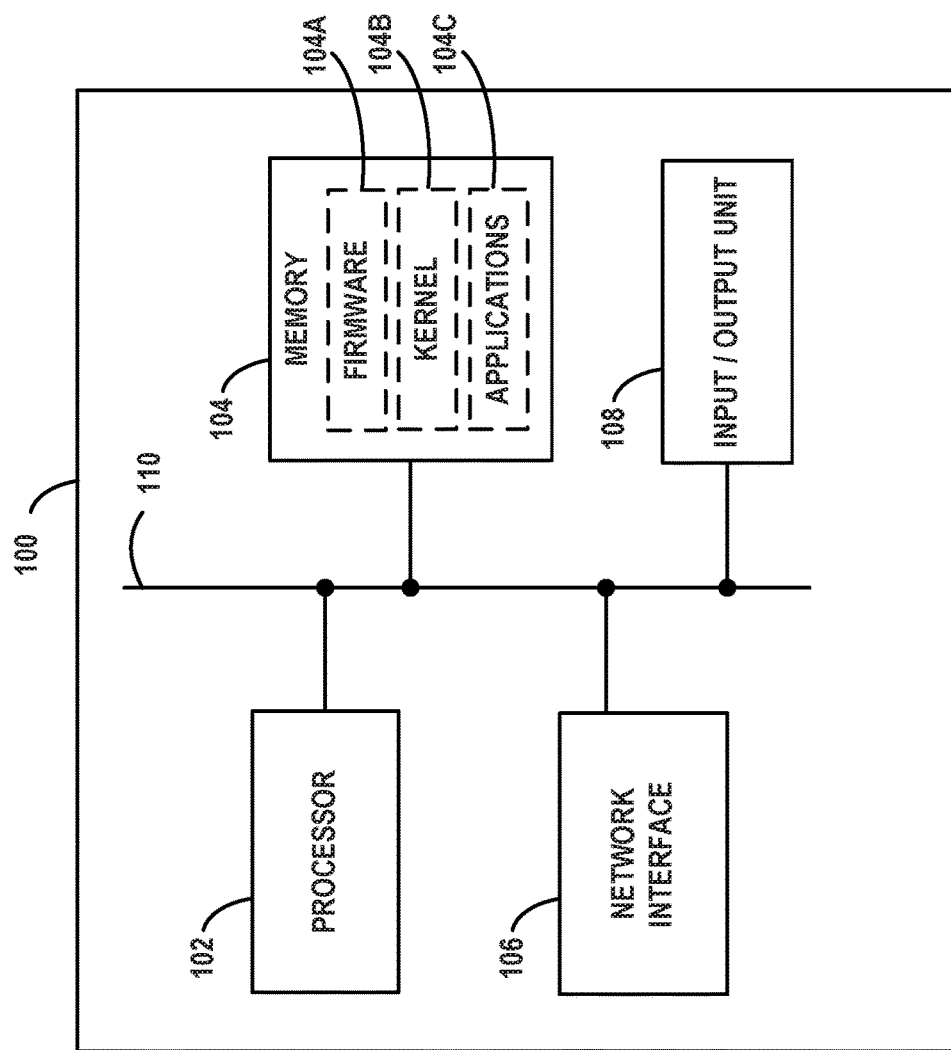
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
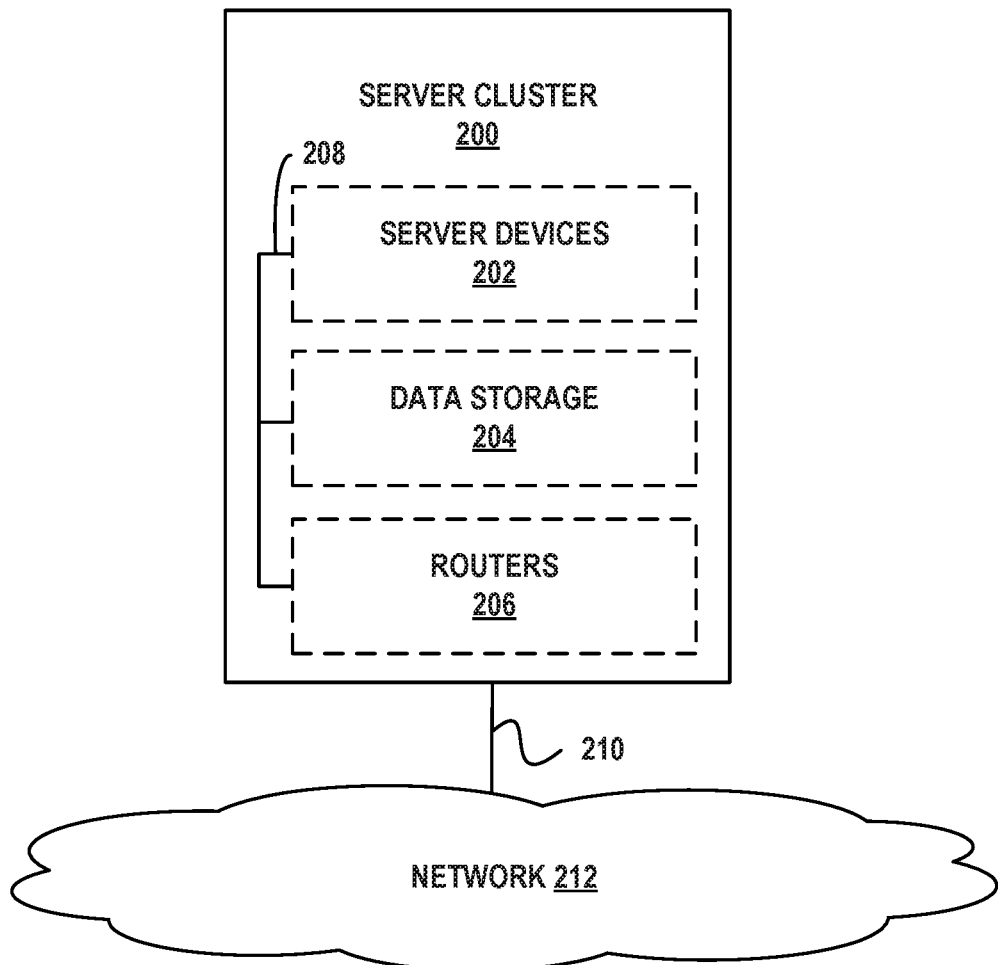
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
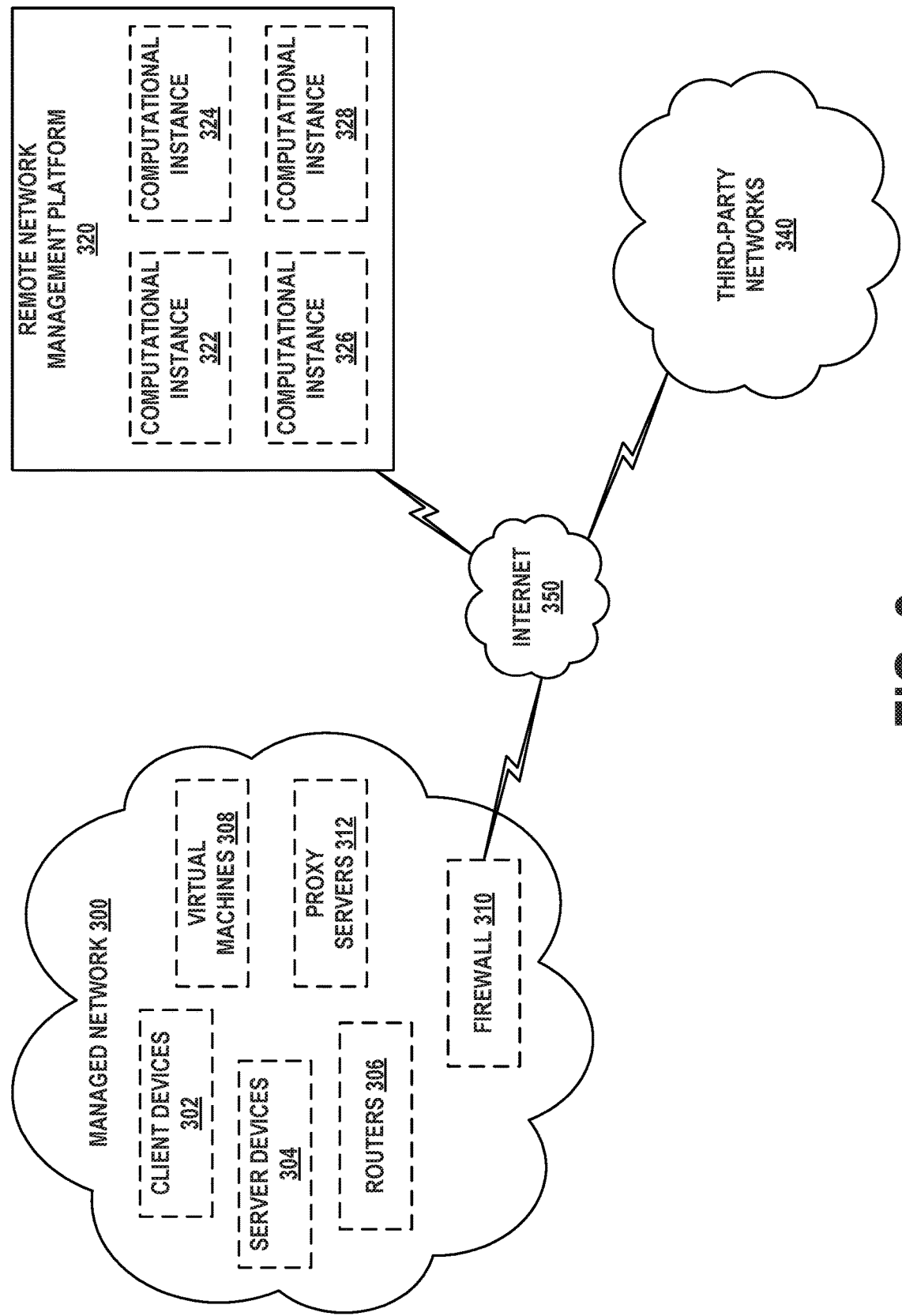
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
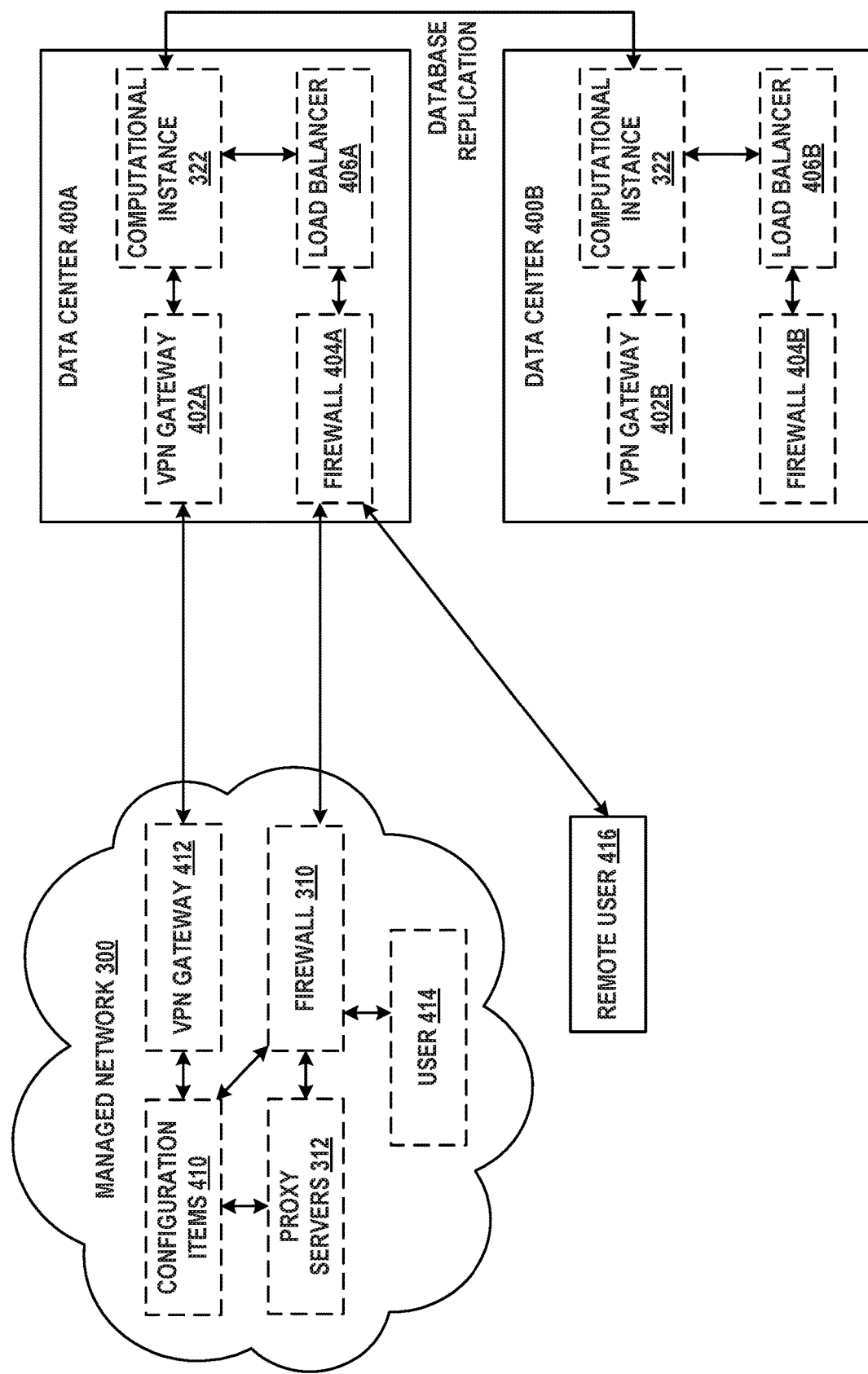
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
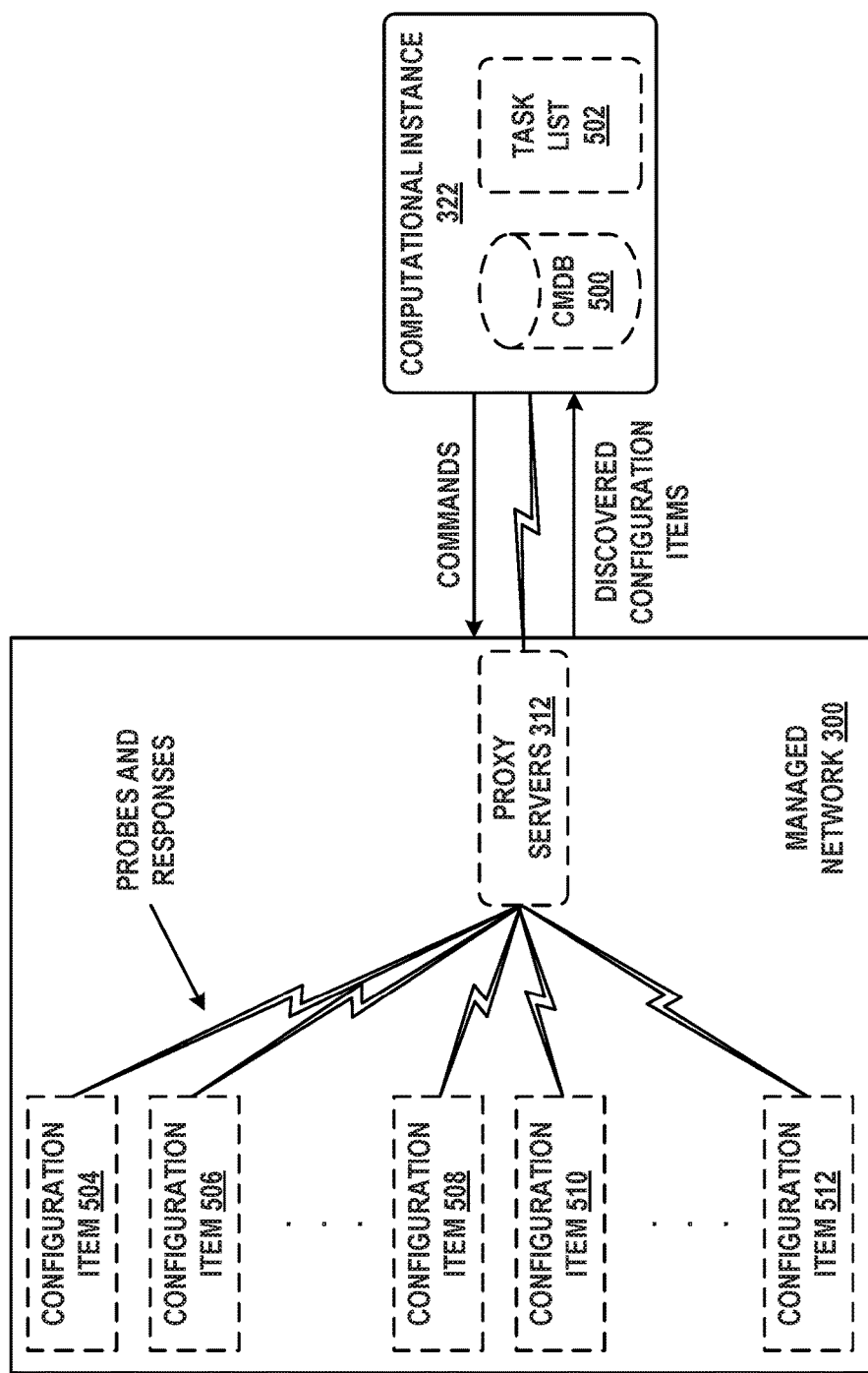
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
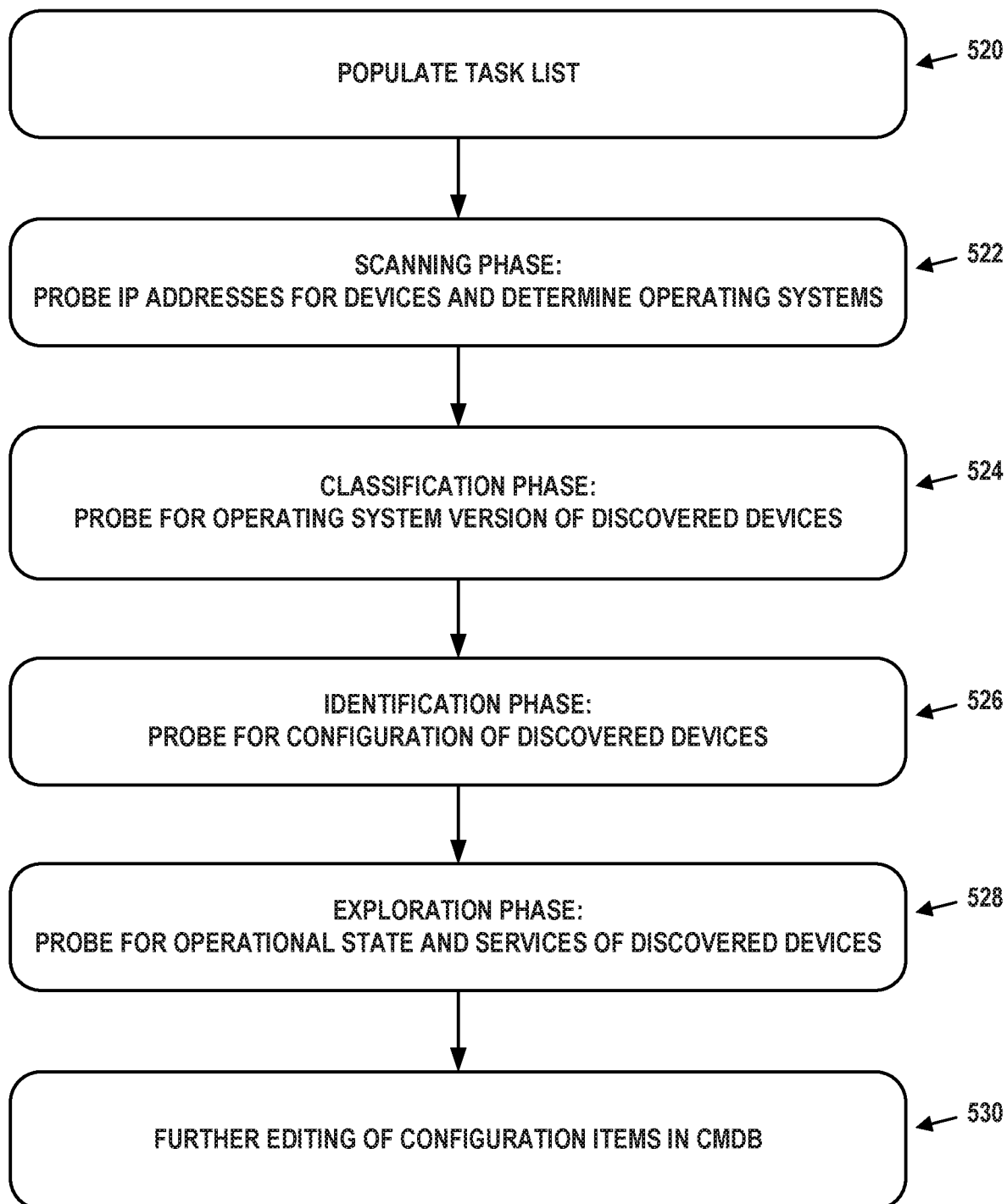
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Workflow Design Tool

Computational instances of the remote network management platform discussed herein may enable the specification and execution of workflows on behalf of their respective managed networks. A workflow is a specific sequence or series of tasks that, when performed, accomplish one or more goals. In some cases, workflows may be represented as flow charts, with one or more starting states, intermediate states, and ending states connected by various transitions therebetween. Some states may be visited zero times or more than one time. Also, some states may have more than one possible next state, thus representing a decision to be made in the workflow, either based on user input, automated input, information stored in a database, or by way of other mechanisms. Triggers may also be defined that cause certain transitions between states, input to be acquired, or output to be produced.

Such a workflow can be implemented on a computational instance through use of a software-based workflow design tool. Such a tool presents the workflow designer with options for defining the states, transitions, triggers, actions, input data, output data, and other characteristics of the workflow. The tool may utilize a GUI, and may be embodied as a series of one or more web pages and/or web-based applications deployed upon the computational instance. Once completed and released, employees of the managed network may make use of the workflow to carry out various tasks in an organized and efficient fashion. Notably, the workflow design tool can be a so-called "low-code/no-code" solution, with which designers either write very little program code, or no code at all, to implement the workflow.

While the embodiments herein provide support for general workflow design, an example workflow design tool may be implemented based around specific definitions of triggers, actions, and workflow logic. Triggers may be used to specify conditions that start a workflow, such as a change to an entry in a database (e.g., the addition or updating of a configuration item in a CMDB) or according to a schedule (e.g., once per day or once per week). A trigger causes one or more actions to be performed, and each action may be controlled by workflow logic that specifies the conditions that must be true for the action to be performed. The action may involve changing the state of information in a database, sending a notification (e.g., an email) to a user, and so on.

In some cases, sub-flows may be defined and incorporated into a workflow. A sub-flow may be an automated or semi-automated process including a sequence of reusable actions and specific data inputs that allow it to be started from within a flow, another sub-flow, or script. Thus, sub-flows can be applied to multiple workflows.

As an illustrative example of a workflow, consider an employee offboarding scenario, in which an employee has left an enterprise for some reason (e.g., the employee quit, got fired, passed away, etc.). The goals of the workflow are to: (i) look up and cancel any pending catalog requests (e.g., equipment requisitions) opened by the departed employee, and (ii) reassign any open tasks (e.g., pending approvals, units of work that are to be accomplished) assigned to the departed employee to his or her manager. In various embodiments, more or fewer goals may be present.

Figure 6A:
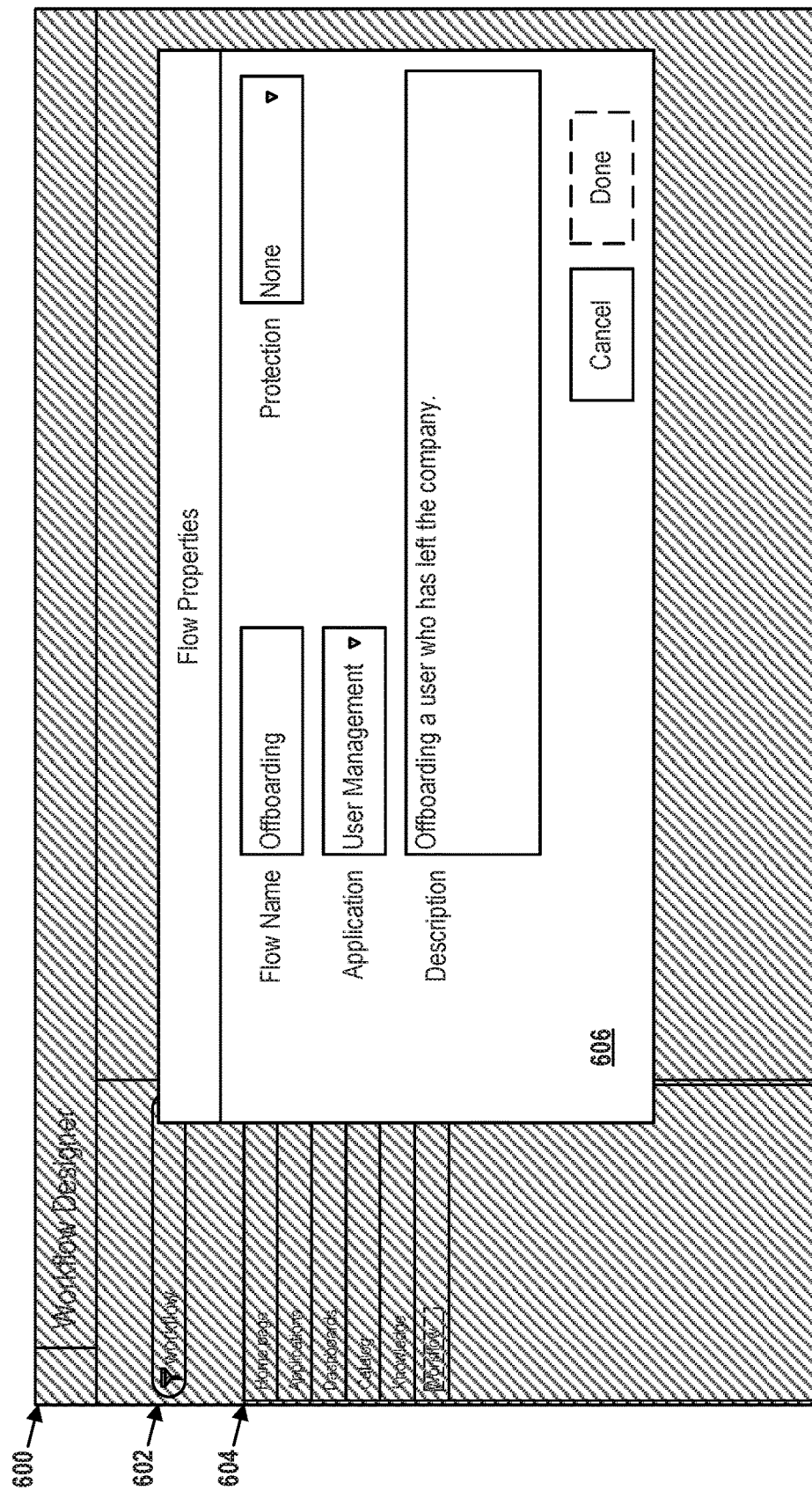

The workflow design tool may present the designer with a series of GUI pages that allow the designer to specify the workflow. Examples of such pages are shown in FIGS. 6A-6J, while results of an automated test of the workflow are shown in FIG. 6K. Notably, these examples are merely for purposes of illustration and not intended to be limiting. The workflow design tool may be able to provide other GUIs including alternative arrangements of information usable for designing workflows.

FIG. 6A depicts GUI 600. The background of GUI 600 shows a web-based menu for selecting features and/or applications supported by a computational instance. This background is denoted as such by hash marks.

For example, GUI 600 includes dialog box 602 in which a user has entered the search term "workflow". This selects the workflow design tool from the bottom of menu 604. This selection is reflected by the text "Workflow Designer" appearing at the top of GUI 600.

GUI 600 also includes pop up window 606. Alternatively, window 606 may be a pane overlaid on top of GUI 600 and not a separate window. Regardless, window 606 allows a user to initiate creation of a new workflow by specifying its properties. In GUI 600, these properties are the workflow's name "Offboarding", the workflow's scoped application "User Management", the workflow's description "Offboarding a user who has left the company", and whether the workflow is to be protected. In alternative embodiments more or fewer properties may be specified.

The workflow's name may be free-form text entered by the user. The workflow's scoped application may be selected from a drop-down menu of applications or specified as global. As the workflow in GUI 600 is limited to the "User Management" scoped application, this workflow may be considered to be part of this application. The workflow's description may also be free-form text. The workflow's protection specifies whether it is modifiable ("none") or read-only ("read-only") by other workflow designers or users.

Once the user is satisfied with the information entered in window 606, the user may select or otherwise activate the "Done" button. This selection is denoted in FIG. 6A by this button being depicted with a dashed line. Once the user completes the dialog of window 606, the next phase of the workflow design tool, which allows the user to specify a trigger, may be displayed.

Figure 6B:
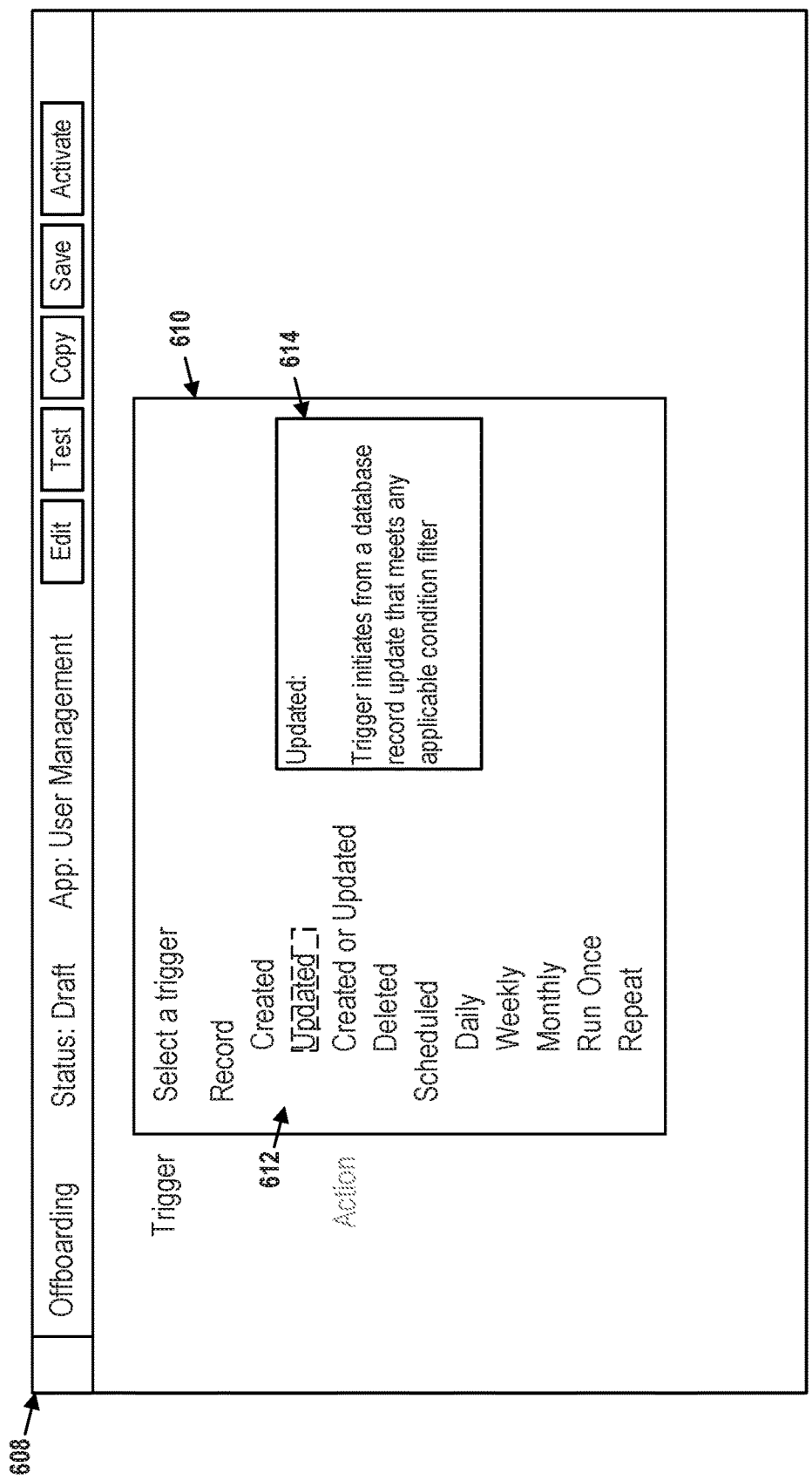

FIG. 6B depicts the first part of the trigger specification phase in GUI 608. The top of GUI 608 specifies the workflow's name, "Offboarding", as entered into window 606. This section of GUI 608 also indicates that this workflow is currently in draft form and is part of the "User Management" scoped application. GUI 608 further displays a series of buttons that allow a user to edit, test, copy, save, and activate the workflow, respectively. In alternative embodiments, different types of information about the workflow may be displayed, and there may be more or fewer buttons potentially with different functionality.

Notably, hashmarks are omitted from the background of GUI 608 (as well as all further GUIs) for purposes of readability. Also, the word "Trigger" is shown in a regular, dark color to indicate that a trigger is being specified, while the word "Action" is shown in a lighter color to indicate that action specification is not taking place.

Pop up window 610 (which, like window 606, may be a pane overlaid on top of GUI 608 and not a separate window), may allow a user to specify a trigger for the workflow. As noted previously, two main types of triggers may be supported and these types are shown in menu 612. Record-based triggers may cause a workflow to be performed when a change to one or more specific database records occurs. As depicted in menu 612, these changes may include creation of a record, updating of a record, creation or updating of a record, and deletion of a record. Scheduled triggers may cause a workflow to be performed at one or more specified times. As depicted in menu 612, such a schedule may trigger a workflow daily, weekly, monthly, just once (at a specified time), or to repeat at a user-specified interval.

In FIG. 6B, menu 612 indicates, with a dashed line, that the user has selected a trigger for when a record is updated. This may cause information box 614 to be displayed, which explains the behavior of the selected trigger.

Figure 6C:
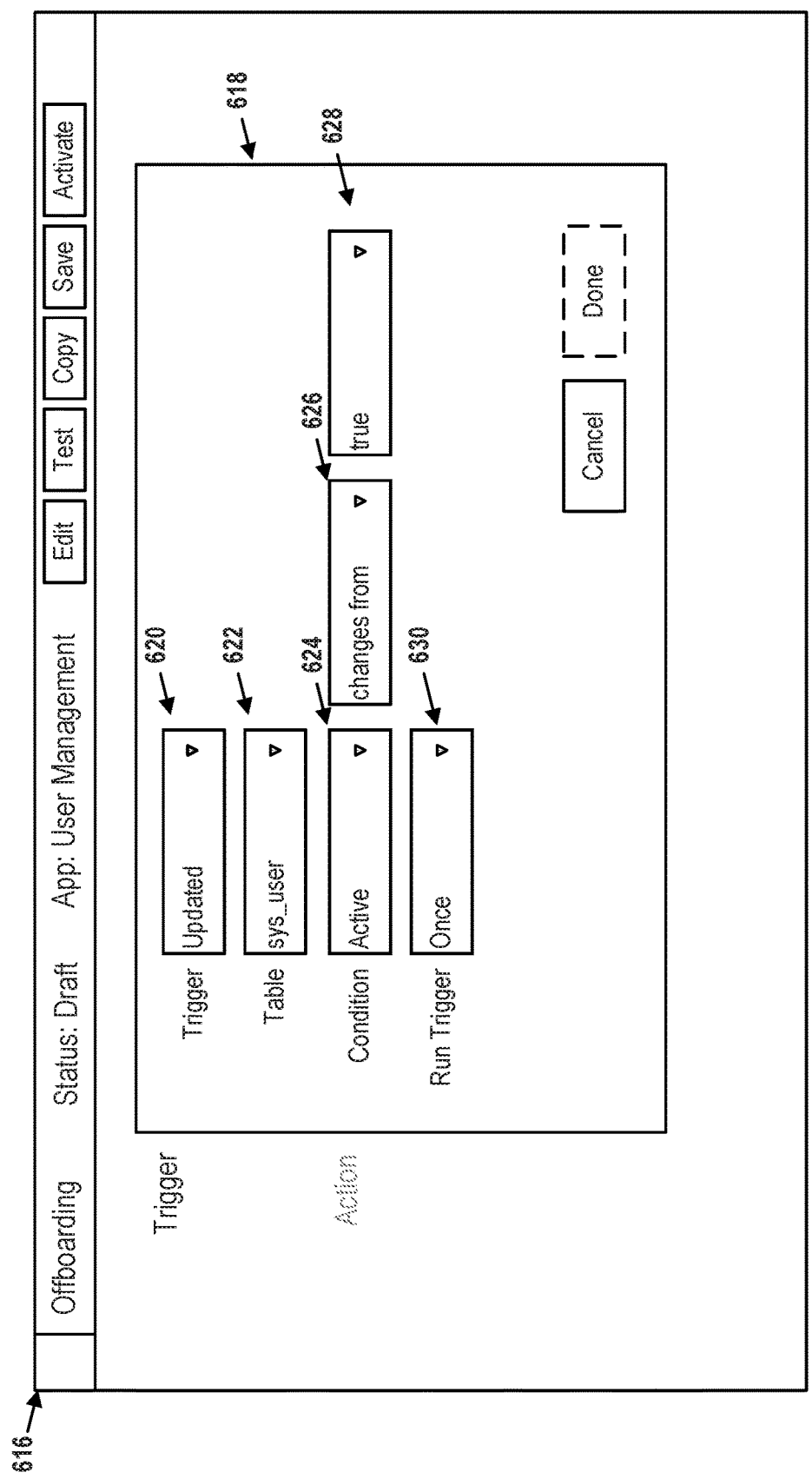

FIG. 6C depicts the second part of the trigger specification phase in GUI 616. GUI 616 assumes that the selection shown in FIG. 6B has been finalized. Thus, GUI 616 depicts pop up window 618 (which, like window 606, may be a pane overlaid on top of GUI 616 and not a separate window), that may allow a user to further specify a trigger for the workflow.

Window 618 contains a number of drop-down menus, some of which may be automatically populated based on the user's selection(s) from GUI 608. Particularly, trigger menu 620 may be populated to reflect the user's selection of the "Updated" option, and run trigger menu 630 may be populated to reflect that record-based triggers are expected to just run once. Nonetheless, the user may modify these selections in window 618.

Table menu 622 allows the user to specify a database table in which records can be found. As shown, this table is sys_user, which is assumed to contain one entry for each employee in the company. Table menu 622 may be capable of displaying a list of one or more available tables.

Condition menus 624, 626, and 628 allow the user to specify a condition of records in the selected table that will cause the workflow to be performed. This condition may be a state or a transition. For instance, condition menu 624 specifies "Active" to indicate that the records must be active, condition menu 626 specifies "changes from" to indicate records that change from active, and condition menu 628 specifies "true" to indicate any record that changes from active to another state.

In various embodiments, condition menu 624 may include entries for various fields in the sys_user table. These fields may include the phone number, building, city, department, address, manager, role, and so on. Condition menu 626 may include entries for "is", "is not", "is empty", "is not empty", "is anything", "is same as", "is different from" "changes", "changes from", "changes to", and/or various other logical operations. Condition menu 628 may include entries for items that are contextually based on the selections made for condition menus 624 and 626.

Viewed as a whole, the trigger specification of window 618 indicates that the workflow is to be performed once when any entry in the sys_user table is updated from active to another state (e.g., inactive). This would indicate that the user is no longer an active employee of the company.

Figure 6D:
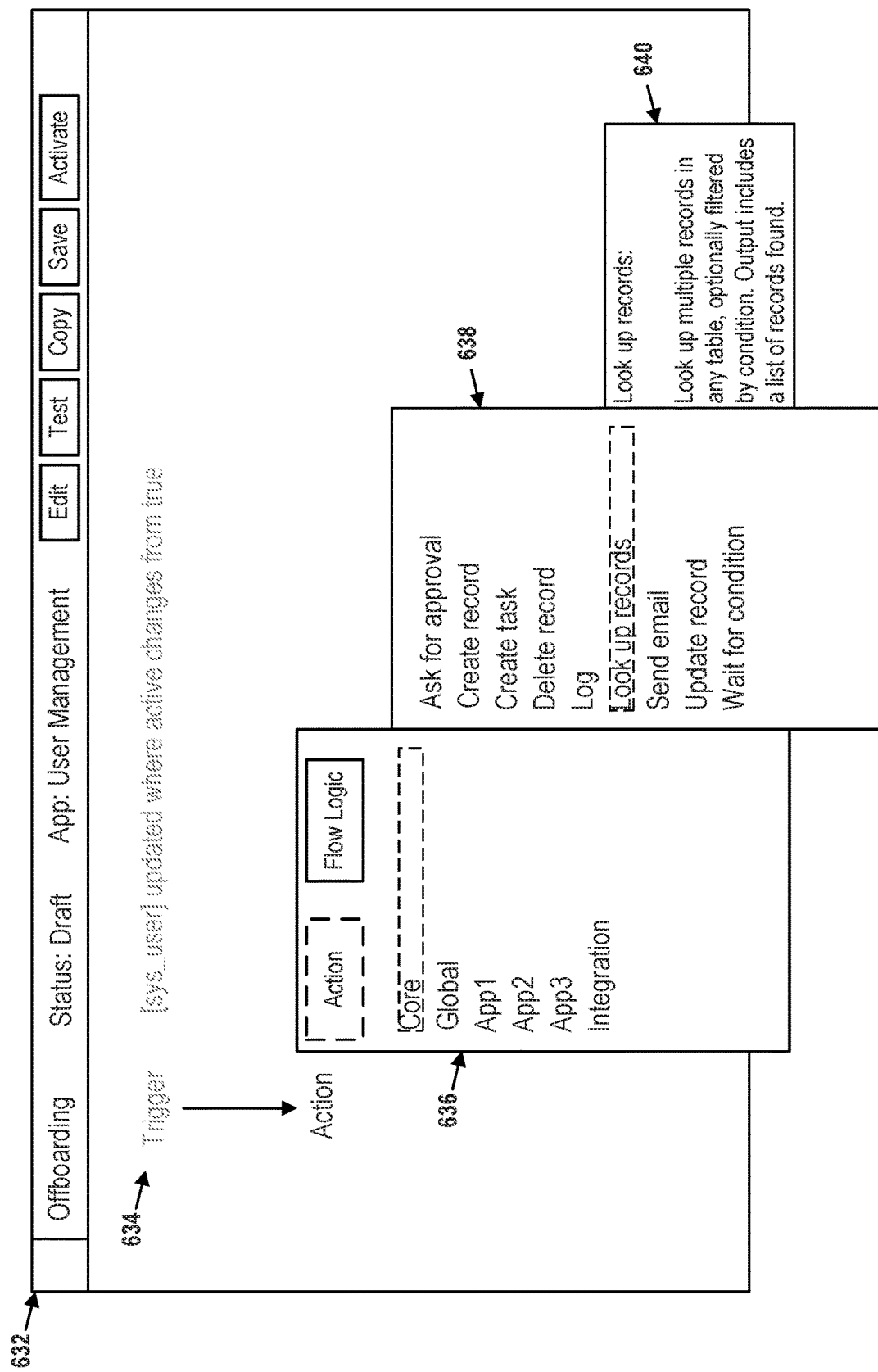

FIG. 6D depicts the first part of an action specification in GUI 632. Notably, at 634, the word "Trigger" is accompanied by a description of the trigger specified in FIGS. 6B and 6C. Further, this text is grayed in order to indicate that the trigger is no longer being specified.

As shown in menu 636, the user has the option of specifying an action or flow logic. The dashed line around the "Action" button indicates that an action is being specified. Particularly, menu 636 displays several contexts for the action being specified. For example, "Core" actions are supported by the computational instance as a default, while "Global" actions include all core actions, application-based, and integration-based actions. Application-based actions, "App1", "App2", and "App3", are actions supported by respective applications built on top of the remote network management platform. These may include, for example, various types of IT service management, IT operations management, customer service management, security operations, and CRM applications. Integration-based actions include actions defined by or supported by third-party applications integrated with the remote network management platform. These may include, for example, virtual chat applications, messaging applications, and so on. Each of these built-in or third-party applications may explicitly expose interfaces (referred to as "spokes") to the workflow design tool so that the workflow design tool can support workflows including data and/or functionality of these applications.

In FIG. 6D, the user has selected the "Core" context. Based on this selection, sub-menu 638 is displayed. This sub-menu provides the user the ability to select from a number of specific actions, such as "Ask for approval", "Create record", "Create task", "Delete record", "Log", "Look up records", "Send email", "Update record", and "Wait for condition". From these, the user has selected "Look up records". Accordingly, information box 640, that describes the selected action, may be displayed.

Figure 6E:
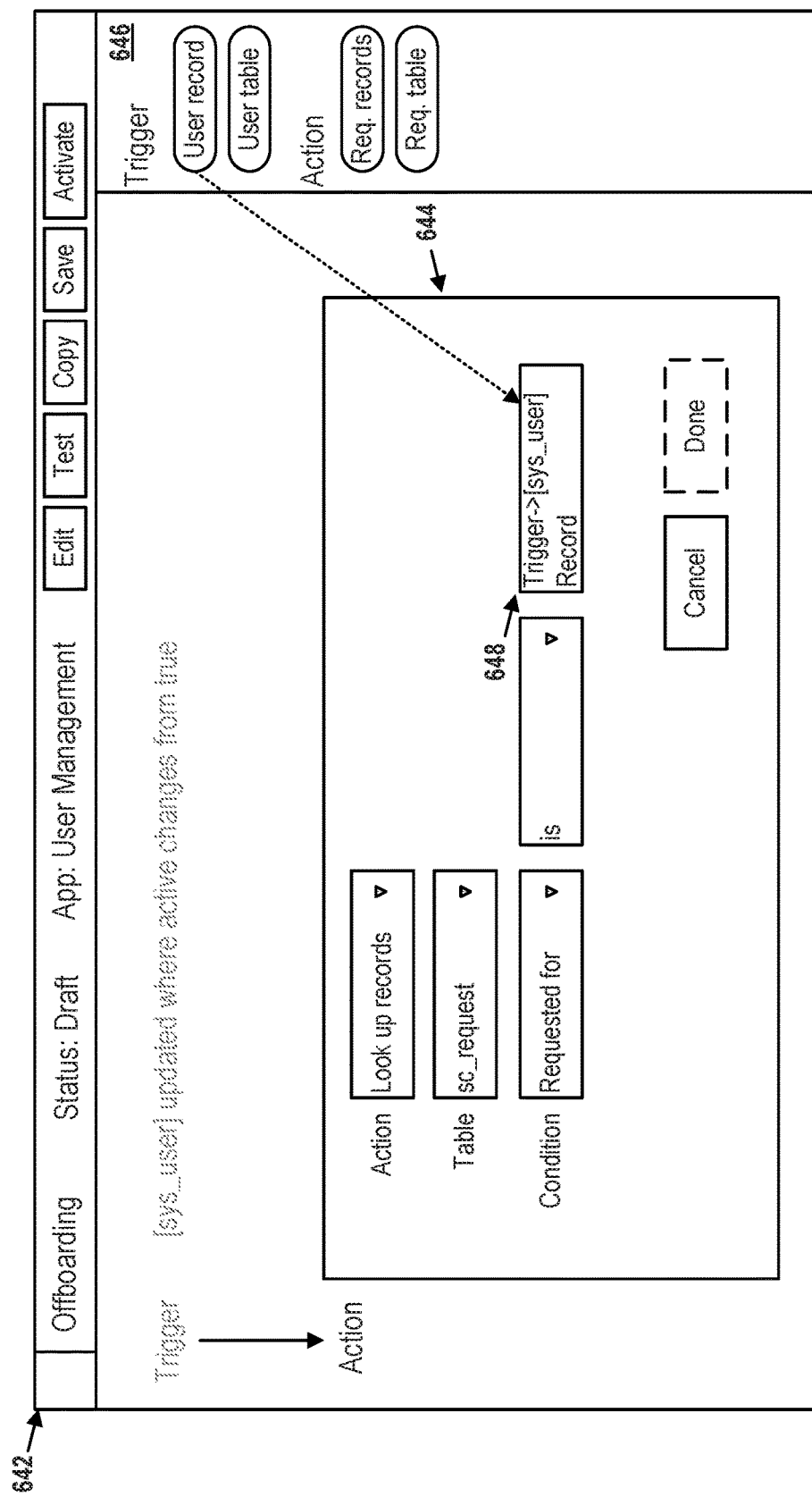

FIG. 6E depicts the second part of the action specification in GUI 642. Pop up window 644 (which, like window 606, may be a pane overlaid on top of GUI 642 and not a separate window), may allow specification of a table in which to look up records and the conditions that these records must meet. As shown in window 644, the action (as specified in FIG. 6D) is to look up records, and the table in which to perform this look up is sc_request (a table that contains catalog requests made by users). The records returned from sc_request are those where the "Requested for" field matches the user identified in the trigger step (i.e., a user whose active status has changed).

FIG. 6E also depicts column 646 containing pill-shaped user interface elements ("pills") arranged according to the previously-defined trigger as well as the action currently being defined. These pills are capable of being dragged from column 646 to the rightmost selectable item 648 in the condition field, as shown by the dotted arrow. User interface pills in this context are typically oval-shaped items that refer to data previously specified in the workflow and may be automatically placed in the user interface as this data is specified in the workflow design tool. In some embodiments, user interface chips or tags (with various shapes) may be used instead.

Notably, the two pills under the "Trigger" heading in column 646 refer to the user record(s) returned by the trigger (e.g., an entry in sys_user that changed from active to another state as specified in FIG. 6C) and the table upon which the trigger operates (e.g., sys_user as specified in FIG. 6C). The two pills under the "Action" heading in column 646 refer to the records found by the action being defined in FIG. 6E, as well as the table in which these records are located (e.g., sc_request).

The user interface elements, such as the pills in column 646, are a significant convenience for the user specifying the workflow, as they allow the user to easily include a reference to data or tables previously specified or referred to in the workflow. In this way, the user does not need to type in a specific reference to this information, and need only drag and drop a pill instead.

Once the user is satisfied with the information entered in window 644, the user may select or otherwise activate the "Done" button. This selection is denoted in FIG. 6E by this button being depicted with a dashed line. Once the user completes the dialog of window 644, the next phase of the workflow design tool, which allows the user to specify flow logic for the action, may be displayed.

Figure 6F:
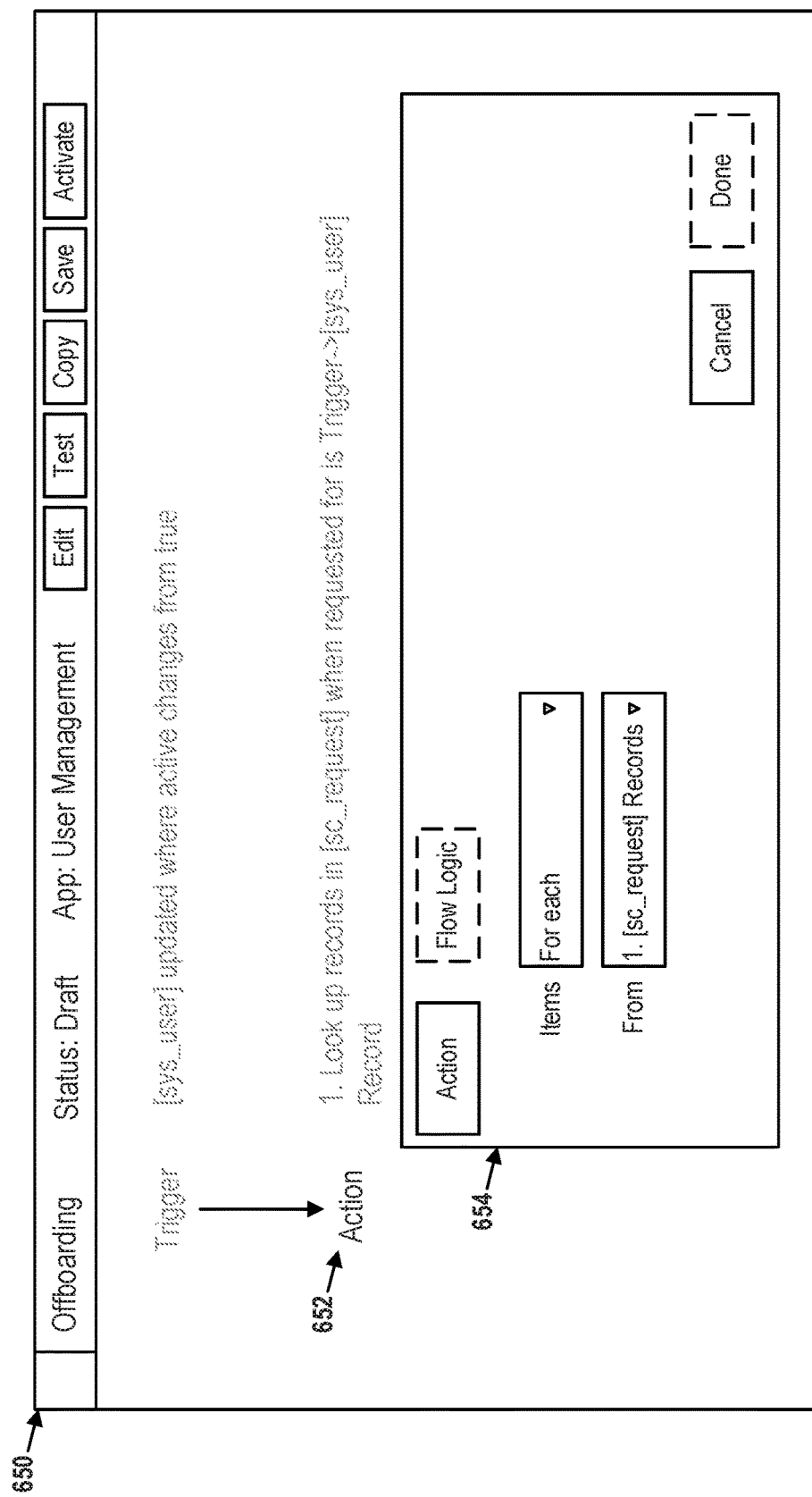

FIG. 6F depicts flow logic specification in GUI 650. Flow logic may be tied to an action, and specifies how the action is to be carried out. Notably, at 652 the word "Action" is annotated with a description of the action specified in FIGS. 6D and 6E.

Pop up window 654 may allow specification of whether the workflow operates on some or all items returned by the action specified in FIGS. 6D and 6E. The "Flow Logic" button is depicted with a dashed line to show that flow logic, rather than an action, is being specified. In this case, the selections made in window 654 indicate that the workflow operates on all items returned from the query specified in FIG. 6E. Notably, the "1. [sc_request] Records" value in the "From" field of window 654 indicates that the flow logic is to be applied to the output of Action 1, specified at 652. Notably, the value of the "From" field may be populated by a pill dragged and dropped from a column containing such pills. This column is not shown in FIG. 6F for purposes of simplicity, but may resemble column 646 of FIG. 6E.

Once the user is satisfied with the information entered in window 654, the user may select or otherwise activate the "Done" button. This selection is denoted in FIG. 6F by this button being depicted with a dashed line. Once the user completes the dialog of window 654, the next phase of the workflow design tool, which allows the user to specify a sub-action for the flow logic, may be displayed.

Figure 6G:
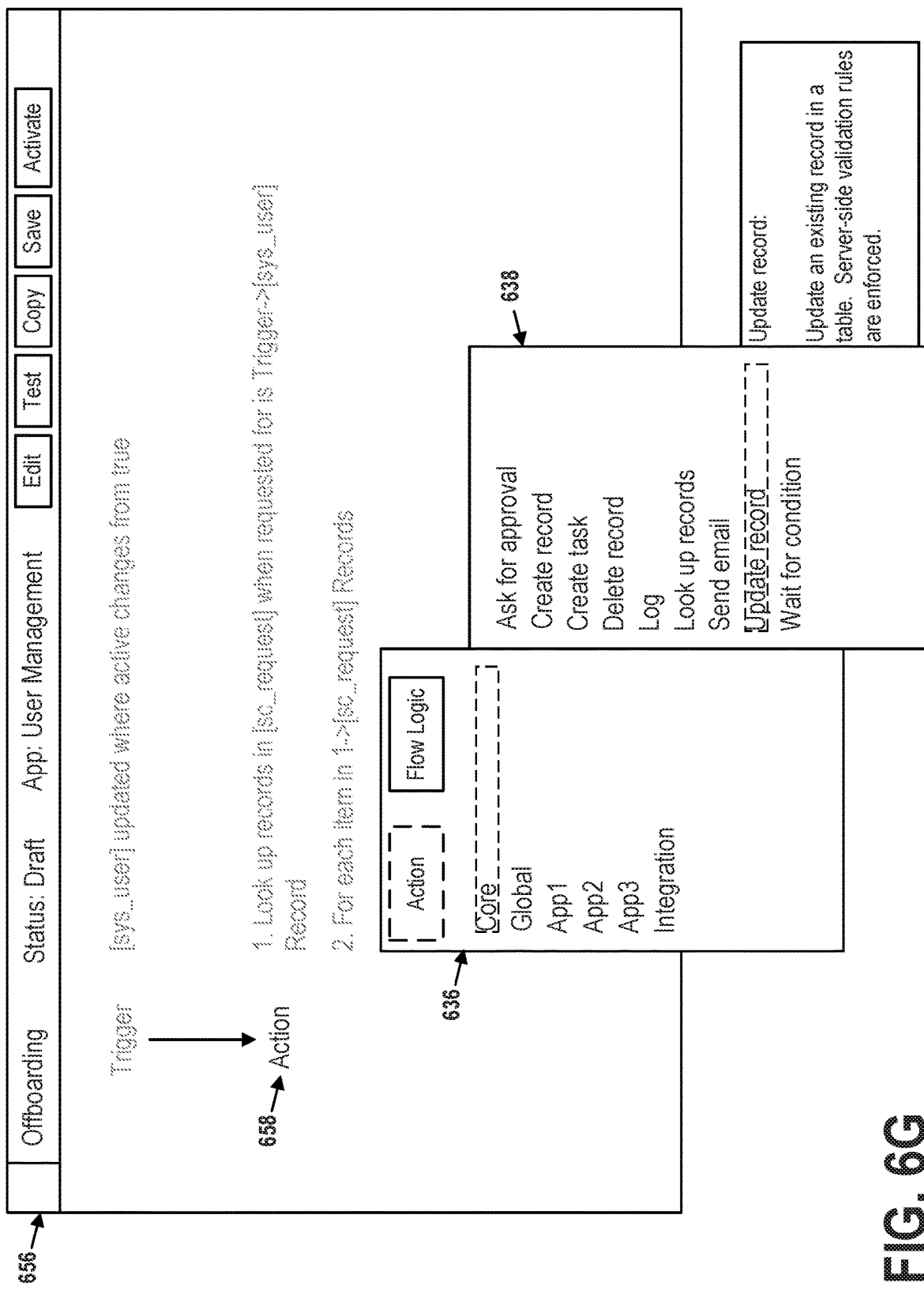

FIG. 6G depicts a sub-action specification in GUI 656. Notably, at 658, the word "Action" is accompanied by an updated description of the action and flow logic specified in FIGS. 6D, 6E, and 6F. Further, this text is grayed in order to indicate that the flow logic is no longer being specified. Notably, the sub-action specification once again displays menu 636 and sub-menu 638, this time with "Core" and "Update record" selected. Thus, GUI 656 depicts the user specifying that records will be updated for each item returned by the action defined in FIGS. 6D and 6E.

Figure 6H:
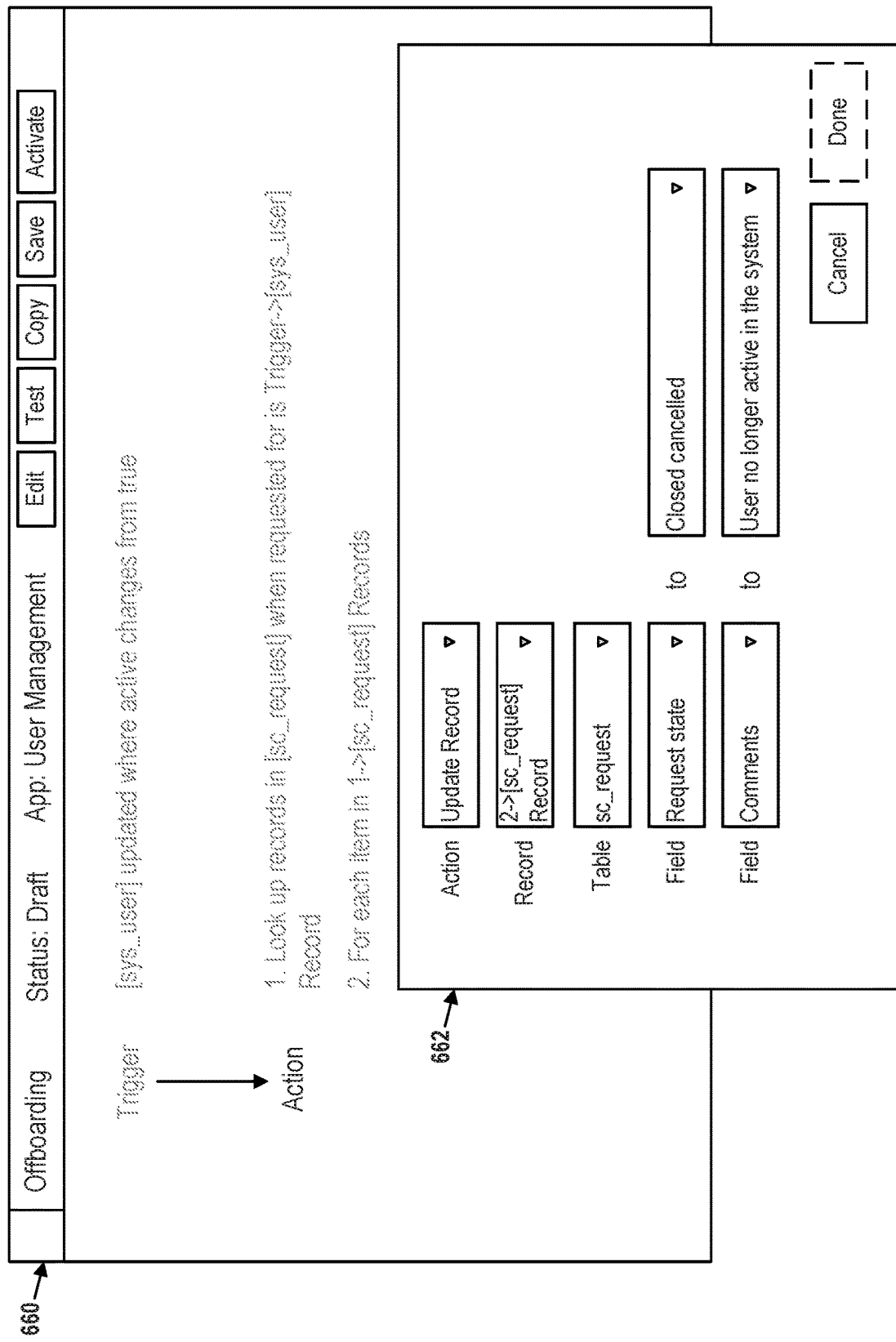

FIG. 6H continues this sub-action specification in GUI 660. Pop up window 662, may allow specification of actions to be taken on items returned by the flow logic specified in FIG. 6F. Particularly, the options shown in window 662 indicate that, for each record in the sys_user table that is returned by the trigger, any record in the sc_request table that was requested for the same user will be updated. The user also specifies two fields that are to be updated for matching records. The "Request state" field is to be updated to "Closed cancelled" to cancel the departed employee's pending catalog requests. The "Comments" field is also updated to "User no longer active in the system" to indicate why the request was cancelled.

Notably, the value of the "Record" field may be populated by a pill dragged and dropped from a column containing such pills. This column is not shown in FIG. 6H for purposes of simplicity, but may resemble column 646 of FIG. 6E.

Once the user is satisfied with the information entered in window 662, the user may select or otherwise activate the "Done" button. This selection is denoted in FIG. 6H by this button being depicted with a dashed line.

Figure 6I:
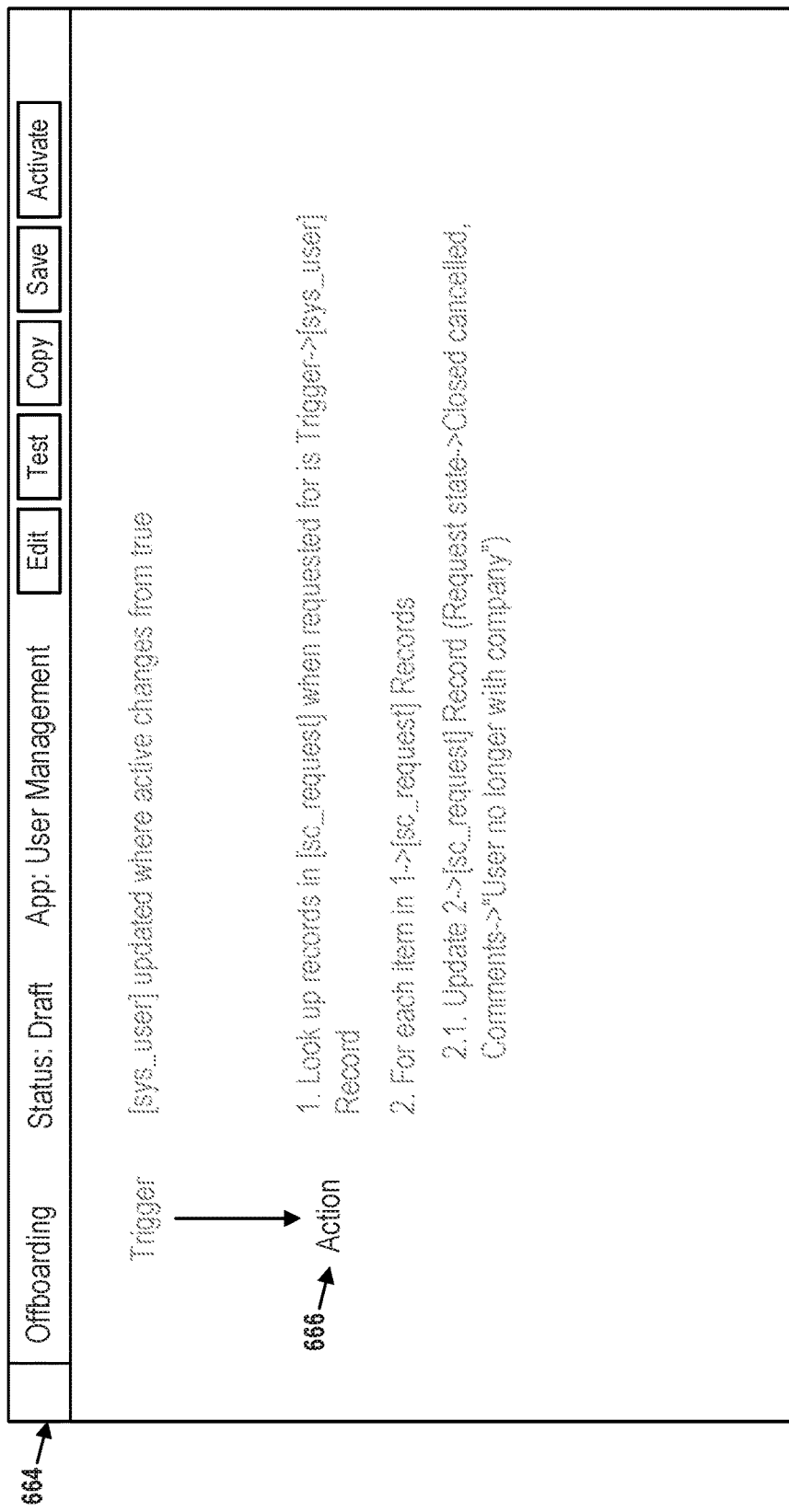

FIG. 6I shows GUI 664 depicting the workflow defined so far. At 666 the action specified in FIGS. 6D, 6E, 6F, 6G, and 6H is displayed. It is broken down into steps 1 (looking up records in the sc_request table that were requested for the employee identified by the trigger), 2 (for each these records, performing step/sub-action 2.1), and 2.1 (updating these records by closing them and adding an appropriate comment).

Figure 6J:
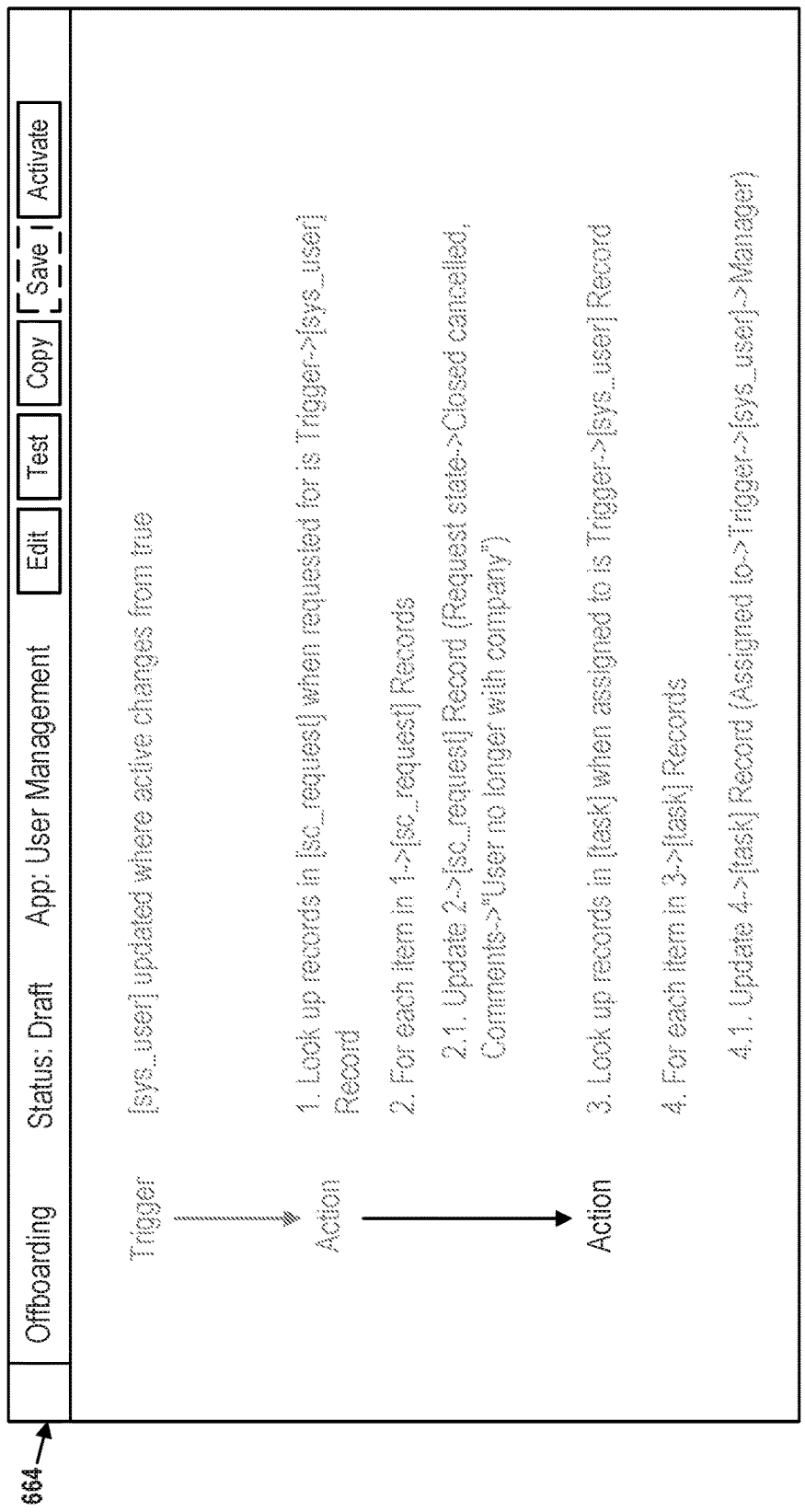

The rest of the desired workflow, as introduced above, also involves reassigning all tasks assigned to the departed employee to that person's manger. This further step is depicted in FIG. 6J. In order to avoid a degree of repetition, the GUIs for specifying the action, the flow logic, and the sub-action for task reassignment are omitted. Instead, FIG. 6J depicts GUI 664 updated to show the complete workflow.

Notably, step 3 looks up records in the task database table (which contains entries for tasks to be carried out by employees) that are assigned to the employee identified by the trigger. Step 4 specifies flow logic that, for each of these records, indicates that step/sub-action 4.1 is to be performed. Step 4.1 indicates that, for each record identified in step 4, the "Assigned to" field is to be changed to the manager of the identified employee.

In this way, arbitrarily complex flow-chart-like workflows can be rapidly designed in a data-centric fashion. The designer need not write any code, and is guided through the workflow specification by a series of GUIs that help the designer with appropriate menus and other interface elements. As a result, the designer saves a significant amount of time. In practice, experiments have shown that workflows can be specified in hours rather than the days typically needed for manually coding the workflows in a high-level programming language (e.g., JAVA®, JAVASCRIPT®, C++, and so on).

Another benefit of this workflow design tool is that it allows a workflow to be tested by the same GUI prior to deployment. FIG. 6K shows GUI 668, which contains the same information as GUI 660 from FIG. 6J, but also includes three columns reflecting the outcome of such a test. The "State" column indicates whether each step has been completed (in this example, all steps were completed), the "Start time" column indicates the time at which each step began, and the "Duration" column indicates how long each step took to be performed, in milliseconds. This allows the designer to verify that each step is properly performed, as well as to identify any steps that take an inordinate amount of time to complete. In alternative embodiments, other information may be displayed.

In the examples of FIGS. 6A-6K, a workflow is designed. The user persona that carries out such a process may be referred to as a workflow designer. However, actions may be designed in an analogous fashion (e.g., by way of similar GUIs) by a user with a persona of an action designer. Thus, an action designer may define custom actions that can be published, and published actions can be selected and incorporated into workflows by a workflow designer.

VI. Example Remote Software Application System

The integration-based actions provided by the software-based workflow design tool may also include actions supported by third-party applications that are not provided or executed by the remote network management platform. Such software applications may be referred to as remote software applications. A workflow may interact with objects and/or functions provided by various remote software applications using such integration-based actions. As a result, the workflow may take advantage of functionality provided by these remote software applications without having to independently implement this functionality (e.g., in the form of a software application that has to be independently developed and/or maintained).

Such interaction with a particular remote software application may be facilitated by a plurality of actions that collectively make up an interface (i.e., a spoke or integration connector) for the particular remote software application. For example, each action may allow the workflow to interact with a corresponding object and/or execute a corresponding function of the remote software application. In some cases, the workflow may communicate with a particular remote software application directly. Namely, an action design software application may define the interface for the remote software application such that the workflow may interact with the remote software application without the assistance of other systems (e.g., remote software application systems).

In other cases, however, the workflow may utilize a remote software application system that exposes a plurality of different software applications for execution. That is, the workflow may interact with the remote software application system, which in turn interacts with the particular remote software application on behalf of the workflow. In some implementations, the remote software application system may be configured to provide a channel and/or process for accessing each of the remote software applications in a uniform or standardized manner. The action design software application may take advantage of this uniformity to reduce the amount of complexity involved in defining application-specific interfaces. Namely, rather than defining a plurality of different interfaces, each of which adheres to different standards, practices, or rules associated with a corresponding remote software application, the action design software application may define interfaces that adhere to the uniformity and/or standardization provided by the remote software application system.

Figure 7:
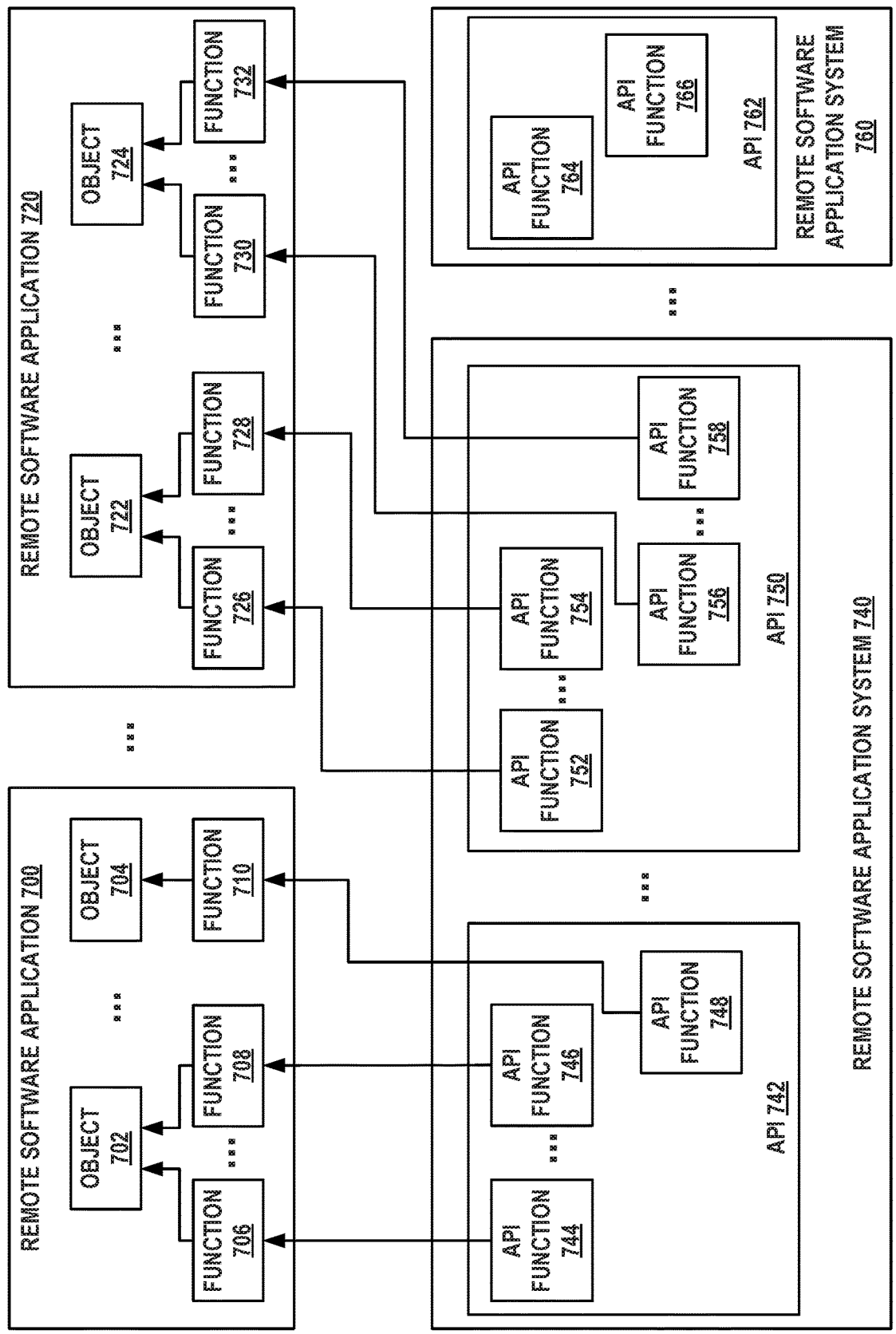
FIG. 7 depicts a remote software application system, in accordance with example embodiments.

FIG. 7 illustrates remote software applications that are accessible by way of remote software application systems. Specifically, FIG. 7 illustrates remote software applications 700-720 and remote software application systems 740-760. Remote software application system 740 provides APIs 742-750 that allow for interaction with remote software applications 700-720, respectively. Similarly, remote software application system 760 provides API 762 for interacting with other remote software applications (not shown). Remote software application systems 740-760 may alternatively be referred to as remote software API management systems, remote software API forwarding systems, or remote software API bridge systems.

Each of remote software applications 700-720 may be hosted and executed by a corresponding computing system.

In one example, remote software applications 700-720 may be hosted and executed by computing devices within third-party networks 340. Remote software application systems 740-760 may be different from and physically separate from the computing systems that host remote software applications 700-720. As such, remote software application systems 740-760 may communicate with remote software applications 700-720 by way of one or more networks in order to expose the functions thereof for execution. Remote software application systems 740-760 may be, for example, IBM® App Connect, CLOUD ELEMENTS®, or another similar system or provider. Notably, remote software application systems 740-760 may be distinct from remote network management platform 320 and managed network 300. Managed network 300 may use remote software application systems 740-760 to execute remote software application 700-720 (e.g., by way of a workflow design software application provided by remote network management platform 320).

Remote software application 700 includes objects 702-704 and functions 706-708 and 710. Functions 706-708 may be configured to interact with (e.g., create, delete, access, and/or modify) object 702, and function 710 may be configured to interact with object 704. Similarly, remote software application 720 includes objects 722-724 and functions 726-728 and 730-732. Functions 726-728 may be configured to interact with object 722, and functions 730-732 may be configured to interact with object 724. Objects 702-704 and 722-724 may, in general, represent any data structure or portion thereof configured to hold information relevant to the operation of its respective remote software application. For example, remote software application 700 may be an accounting application. Thus, objects 702-704 may include accounts, bills, contracts, customers, employees, estimates, invoices, and case messages, among other possibilities. When object 702 represents, for example, an invoice, functions 706-708 may include a "create invoice" function, a "retrieve invoice" function, and a "modify invoice" function, among other possibilities.

A workflow, another software application, or a computing device may interact with remote software applications 700 and/or 720 directly (e.g., without utilizing remote software application system 740) to request execution of the functions thereof and/or interact with the objects thereof. However, there may be differences among remote software applications 700-720 in how these applications are configured for such interaction. For example, the remote software applications may differ in the language and/or syntax used for invoking the functions thereof, and/or the communication channels by way of which the remote software application are accessible (e.g., command-line interface versus representational state transfer (REST) API), among other possible differences. Thus, the process of generating a respective direct interface by the action design software application for each of remote software applications 700-720 may be application-specific, and may therefore be complex and time-consuming.

Notably, however, remote software application system 740 provides APIs 742-750 that may standardize the manner of interacting with each of remote software applications 700-720, allowing the action design software application to generate interfaces for multiple different remote software applications by way of a uniform process. Namely, API 742 includes API functions 744-746 and 748 for interacting with functions 706-708 and 710, respectively. Similarly, API 750 includes API functions 752-754 and 756-758 for interacting with functions 726-728 and 730-732, respectively. The implementation of each of APIs 742-750 may account for and operate according to the specific standards, processes, and/or rules of its respective remote software application. However, the manner of identifying APIs 742-750, identifying the API functions thereof, and/or interacting with APIs 742-750 may be similar across the APIs. APIs 742-750 and 762 may thus hide, remove, and/or make any variations among remote software applications 700-720 inconsequential, thereby facilitation definition of interfaces for these remote software applications.

For example, APIs 742-750 and 762 may be REST APIs with which the workflows may communicate by way of hypertext transfer protocol (HTTP) requests and responses. Additionally, as is discussed in more detail with respect to FIGS. 8A-8E, each of APIs 742-750 and 762 may be described by a corresponding API specification that allows the action design software application to define the interfaces therefor. Remote software applications 700-720 might not provide such specifications, thus making definition of the interfaces more difficult (e.g., by necessitating manual definition).

When a particular remote software application is integrated into a workflow, the workflow may interact with the objects and/or functions thereof by way of remote software application system 740. Namely, the workflow may transmit a first request to, for example, API 742. The first request may specify, for example, that API function 748 is to be executed. Accordingly, remote software application system 740 may execute API function 748, which involves transmitting, to remote software application 700, a second request for execution of function 710 (which, in turn, interacts with object 704). The second request may be a reformatted version of the first request that adheres to any application-specific rules, processes, and/or standards of remote software application 700.

Application 700 may execute function 710 and generate an output, which may be transmitted to remote software application system 740. Remote software application system 740 may include this output in a response that is transmitted to the workflow in response to the first request. Remote software application system 740 may thus allow the workflow to utilize the functions and objects of remote software application 700 without directly communicating therewith and without generating an interface that adheres to the rules, processes, and/or standards of remote software application 700.

In some implementations, remote software application system 740 may provide for execution of tens, hundreds, or thousands of remote software applications, each of which may be integratable into workflows by way of corresponding interfaces. Notably, each of these interfaces may be interfaces to corresponding APIs of remote software application system 740, rather than direct interfaces to the individual remote software applications. Since remote software application system 740 may offer a standardized, uniform manner of identifying and executing the functions of remote software applications, the process of generating these interfaces by action design software application may be simpler than that of generating direct interfaces.

VII. Example API Specification

Remote software application systems 740-760 may be configured to provide, for each respective API of APIs 742-750 and 762, corresponding one or more specifications that define the attributes of the respective API. These specifications may indicate how workflows are to communicate with the APIs, the objects that can be interacted with by way of the API, the functions that each API exposes for execution, the inputs of each function, and the outputs of each function, among other aspects of the APIs. The specifications may also identify the different APIs provided by each remote software application system, as well as the service identifiers (e.g., user accounts) that can be used to access the APIs. The specifications may thus allow action design software application to automatically generate the interface for each API, and, consequently, for each remote software application exposed by way of these APIs.

FIGS. 8A, 8B, 8C, 8D, and 8E illustrate excerpts 800, 802, 804, 806, and 808 (i.e., excerpts 800-808) respectively, of example specifications that may be used by the action design software application to define actions that make up the interface for a particular remote software application. The API specifications may be developed and provided by remote software application systems 740-760. Specification excerpts 800-808 are written according to the third version (3.0.0) of the OPENAPI specification standard, as indicated by line 1 of excerpt 800. The OPENAPI specification defines a format for describing representational state transfer (REST) APIs. Notably, however, the action design software application may be configured to support APIs built according to standards, platforms, processes, rules, or protocols other than those associated with REST (e.g., GRAPHQL, ODATA), as well as API specification formats other than OPENAPI (e.g., RAML).

The API specification may be structured hierarchically, and this hierarchy may be indicated by way of indentations, or nesting, of the tags and their respective values. For example, the tags "TITLE" in line 3 of FIG. 8A, "DESCRIPTION" in line 4, and "VERSION" in line 6 are shown indented relative to the tag "INFO" in line 2, and are thus children of the parent tag "INFO." Such a hierarchical structure facilitates parsing of the API specification by the action design software application to identify therein the different attributes of the remote software application systems and the APIs thereof. Notably, while excerpts 800-808 are shown written in YAML Ain't Markup Language (YAML), excerpts 800-808 could alternatively be written in another format such as, for example, JavaScript Object Notation (JSON).

The specification may provide general, bibliographic information (e.g., metadata) of the remote software application system, the APIs thereof, the API functions, and/or the objects with which the API functions interact, as indicated by line 2. This general information may include a title of the specification, indicated on line 3 as "Available Remote software applications," a description of the specification's or API's purpose, indicated on line 4 as "Specifies remote software applications exposed for execution by the remote software application system," and a version of the API, indicated on line 6 as 1.0.5. Notably, a corresponding interface may be defined for each version of the API, or at least each version accompanied by a breaking change to the API. A breaking change may be one that changes the inputs thereof, the outputs thereof, the format of the inputs and/or outputs, or removes functions, among other possibilities.

The specification may additionally indicate one or more servers associated with the remote software application system and/or the APIs thereof, as indicated by line 8. Specifically, the one or more servers may be indicated by corresponding base uniform resource locators (URLs) that address these servers. In the example of FIG. 8A, this section of the specification may be used to identify each of the available APIs, and thus each of the remote software application exposed for execution by the remote software application system. Namely, the API for a first remote software application (e.g., API 742), Application 1 (e.g., remote software application 700), may be addressed by the URL "HTTP://APP_1.REMOTE_APPLICATION_ SYSTEM.COM", as indicated by lines 9 and 10. Similarly, the API for a second remote software application, Application 2, may be addressed by the URL "HTTP://APP_2.REMOTE_APPLICATION_SYSTEM.COM", as indicated by lines 11 and 12.

Excerpt 800 may indicate additional remote software applications exposed for execution by the remote software application system, as indicated by the ellipsis on line 13. For example, the remote software application system may expose a total of ten remote software applications, with the third through the ninth applications not shown in excerpt 800. The API for the tenth remote software application (e.g., API 750), Application 10 (e.g., remote software application 720), may be addressed by the URL "HTTP://REMOTE_APPLICATION_SYSTEM.COM/APP_10", as indicated by lines 14 and 15. Notably, in the example of the tenth remote software application, the application is specified as a resource path parameter (i.e., "/APP_10"), rather than as a sub-domain of the "REMOTE_APPLICATION_SYSTEM.COM" domain. Excerpt 800 may thus indicate the list of remote software applications available for execution by way of the remote software application system.

In some cases, the specification may indicate multiple URLs for each application. For example, a staging server used for testing purposes of Application 1 may be addressed by the additional URL "HTTP://STAGING_APP_1.REMOTE_APPLICATION_SYSTEM.COM". In some implementations, the action design software application may use the base URLs to obtain additional specifications that define the specific API functions exposed by each API, and thus the functions and objects of the respective remote software applications. Alternatively, the specification may provide additional URLs by way of which these additional specifications may be obtained.

When the action design software application defines the interfaces for the remote software applications, the base URLs shown in excerpt 800 may be modified to include therein parameters that cause the respective server devices to invoke the functions of the APIs. To that end, FIGS. 8B, 8C, and 8D illustrate excerpts of the specification of Application 1 that indicate therein the parameters for example functions of Application 1. Namely, the specification may indicate what parameters may be included in the URL to access particular functions of the API, as well as how these parameters are to be included.

Excerpt 802 in FIG. 8B indicates that this specification is titled "Application 1 Functions," as indicated on line 3, and that the specification "Specifies the functions of Application 1 that can be executed by way of the remote software application system," as indicated on lines 4 and 5. At lines 7, 8, and 9, excerpt 802 again indicates the base URL for the server device configured to execute the API used to interact with the functions and objects of Application 1.

Excerpt 802 also indicates on line 11 a URL resource path and a resource path parameter that may be added to the base URL to access FUNCTION_1 of the API. By sending an HTTP GET request, as indicated by line 13, to "HTTP://APP_1.REMOTE_APPLICATION_SYSTEM.COM/FUNCTION_1/{INPUT_1}", as indicated by line 12, a workflow may request from the API execution of FUNCTION_1 with INPUT_1 as input therefor. In this case, "FUNCTION_1/{INPUT_1}" represents a resource path, while the value substituted for "INPUT_1" represents a resource path parameter. Notably, line 16 of excerpt 802 specifies that the value of "INPUT_1" is to be provided as a resource path parameter, rather than as another type of parameter.

Excerpt 802 further specifies that the value of "INPUT_1" is a required input for FUNCTION_1 to be executed, as indicated by line 18. Line 20 indicates the schema, or structure and attributes, of "INPUT_1." Namely, "INPUT_1" is an integer data type and has a minimum value of 1, as indicated by lines 21 and 22, respectively. Accordingly, in order to request execution of FUNCTION_1 with INPUT_1 value of "5", the workflow may transmit an HTTP request to "HTTP://APP_1.REMOTE_APPLICATION_SYSTEM.COM/FUNCTION_1/5". In one example, FUNCTION_1 may be configured to return an object whose ID or other identifier has the value "5". Notably, however, the API functions may perform a wide range of operations, and the example names for function inputs and outputs may thus vary based on context.

Excerpt 802 also defines attributes of the HTTP response that the API will transmit and the workflow may receive in response to the HTTP request, as indicated by line 23. Namely, one possible response is "200" representing the "HTTP 200 OK" standard response code, which indicates a successful request and response. Another possible response is "404" representing the "HTTP 404 NOT FOUND" standard response code which indicates that execution of FUNCTION_1 with the provided value for INPUT_1 did not generate any output (e.g., no matching database entries were found).

While a "404" response might not contain additional information beyond the status code itself, a "200" response may also include the output of FUNCTION_1 organized in a particular format, as specified by lines 25-36. Namely, the response may include a JSON object that contains an integer value for OUTPUT_1, a string value for OUTPUT_2, and a string value for OUTPUT_3. Thus, lines 26-36 indicate the structure of the object with which FUNCTION_1 interacts. In this manner, excerpt 802 generally informs the action design software application of how the corresponding API function behaves and what objects it interacts with, thereby allowing an action to be defined that invokes this function and allows the output thereof to be utilized by subsequent actions.

FIG. 8C illustrates excerpt 804 of the API specification that defines a second function of the API which accepts as input two resource path parameters and a query parameter. As indicated by lines 1-2, the second function is invoked by transmitting an HTTP GET request to "HTTP://APP_1.REMOTE_APPLICATION_SYSTEM.COM/FUNCTION_2/{INPUT_2}/{INPUT_3}". The API expects to receive as input (i) an integer path parameter "INPUT_2," as indicated by lines 5-10, (ii) a string path parameter "INPUT_3," as indicated by lines 11-15, (iii) a string query parameter "INPUT_4," as indicated by lines 16-20, and (iv) an integer query parameter "INPUT_5," as indicated by lines 16-22.

A query parameter is a key-value pair appended at the end of a URL in the following format: "HTTP://EXAMPLE.COM/RESOURCE_PATH?KEY_1=VALUE_1& KEY_2=VALUE_2". Thus, excerpt 804 specifies that a request for execution of FUNCTION_2 with INPUT_2=10, INPUT_3="ACTIVE," INPUT_4="MARK," and INPUT_5=15 should be addressed to "HTTP://APP_1.REMOTE_APPLICATION_SYSTEM.COM/FUNCTION_2/10/ACTIVE? INPUT_4=MARK&INPUT_5=15". FUNCTION_2 may, for example, be configured to return any users in group "10" that are "ACTIVE" (rather than inactive) and whose first name is "MARK", and may limit the maximum number of results to 15.

Notably, the specification may indicate default values for some inputs that are not required. Thus, for query parameter "INPUT_5," excerpt 804 indicates at line 22 that this input is optional (i.e., REQUIRED: FALSE) and line 25 indicates that, when a value for this input is not provided, a default value of 20 is assigned thereto. Much like excerpt 802, excerpt 804 may also indicate the possible responses returned by FUNCTION_2 (not shown).

FIG. 8D illustrates excerpt 806 of the specification that defines a third function of the API which accepts as input a resource path parameter, an HTTP header parameter, and an HTTP cookie parameter. This third example function of the API may be identified by the resource path "/FUNCTION_3/{INPUT_6}", as indicated by lines 1-3. The third function may require as input an integer resource path parameter "INPUT_6," as indicated by lines 5-10, an HTTP header parameter "INPUT_7" provided as a string formatted as a universally unique identifier (UUID), as indicated by lines 11-16, and an HTTP cookie parameter "INPUT_8" provided as an integer having a value of either 0 or 1, as indicated by lines 17-22. The third function may generate an output that is included in a corresponding HTTP response. This output may be indicated by the API specification in a manner similar to that shown in excerpts 802.

FIG. 8E illustrates an alternative format for indicating the object with which a particular API function interacts. Namely, excerpt 808 specifies that FUNCTION_4 of Application 1 may be invoked by transmitting an HTTP request to "HTTP://APP_1.REMOTE_APPLICATION_ SYSTEM.COM/FUNCTION_4". Lines 3-9 indicate the response that FUNCTION_4 is configured to generate. Namely, FUNCTION_4 returns an object OBJECT_4. The structure of this object may be defined in the "COMPONENTS" section of the specification, rather than being defined directly as part of the "RESPONSE" section for FUNCTION_4. Namely, lines 12-22 indicate that OBJECT_4 is made up of FIELD_1 configured to store an integer value, FIELD_2 configured to store a string value, and FIELD_3 configured to store an integer value.

In this way, the specification may separately define (i) the objects that can be interacted with by way of the API, (ii) the functions that can be executed by way of the API, and (iii) the relationships between the objects and the functions. While the conventions for defining objects illustrated by excerpts 802 (object defined as part of function) and 808 (object and function defined independently) are both valid, excerpt 808 may allow the action design software application to more easily and clearly relate multiple functions to a single object due to the explicit use of the "$REF" section of the specification.

The API specification may additionally define a plurality of other possible aspects of the API. For example, the API specification may define authentication standards or procedures followed by the API, various other media types (e.g., XML, form data, portable document format (PDF), and various image formats) that can be provided as input to or received as output from functions of the API, deprecated functions, options for providing parameters to the API in a serialized fashion (e.g., providing a query parameter that associates multiple values with a single key), callback URLs used by one or more functions of the API, links, and specification extensions, among other possibilities. In the case of OPENAPI 3.0.0, for example, the API specification may define any other aspects of the API that are provided for in the OPENAPI specification standard and/or utilized by the API.

For example, these or other specifications may be used to define service identifiers (e.g., user accounts) that can be used with particular APIs. In one example, each API corresponding to a remote software application may include in its specification a list of service identifiers that are usable to authorize access and execution of the functions of that API. Alternatively, each respective service identifier may be associated with a different specification that defines the functions and objects that may be interacted with by using the respective service identifier. In this way, each service identifier may be allowed to interact with varying subsets of the functions and objects of each API and corresponding remote software application.

Notably, the API functions described by excerpts 802-808 are simplistic for illustrative purposes. The API specification may, however, define functions that accept a greater number and different types of inputs, and generate a greater number and different types of outputs than shown in excerpts 802-808.

VIII. Example Interface Design and Workflow Design Operations

Figure 9A:
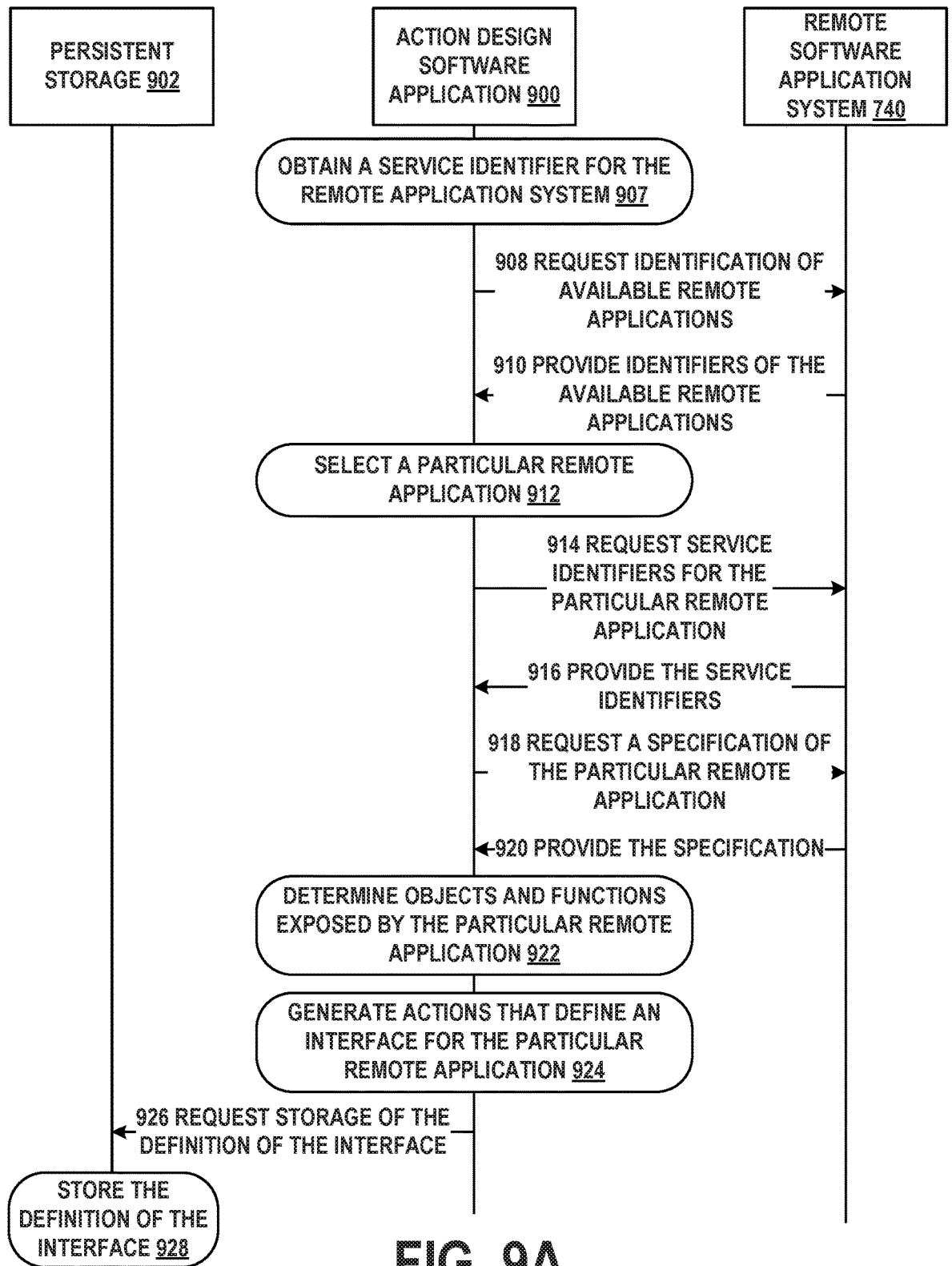
FIGS. 9A and 9B are message diagrams, in accordance with example embodiments.

FIG. 9A illustrates a message diagram of operations involved in defining an interface for a remote software application. The interface may be made up of a plurality of actions that invoke execution of one or more functions of an API of a remote software application system. These functions of the API, in turn, invoke execution of corresponding functions of the remote software application. The interface may thus be used by workflows to execute, by way of the remote software application system, functions of the remote software applications.

Specifically, FIG. 9 illustrates action design software application 900, persistent storage 902, and remote software application system 740. Action design software application 900 may alternatively be referred to as a software-based action design tool, an action definition software application, or an action design software application. Persistent storage 902 may, in some implementations, take the form of a database. In one example, action design software application 900 and persistent storage 902 may be disposed in or form part of a computational instance (e.g., computational instance 322) of remote network management platform 320. This computational instance may be assigned to managed network 300 and thus used to define interfaces and workflows therefor. Remote software application system 740 may be a computing system that provides and maintains the APIs invoked by one or more of the actions defined by action design software application 900. Thus, action design software application may communicate with remote software application system 740 over a network such as the Internet.

Action design software application 900 may initiate definition of the interface by obtaining a service identifier for the remote software application system, as indicated by block 907. The service identifier may be a username and password combination, a web token (e.g., a JSON Web Token), or another form of credentials that allows action design software application 900 to connect to and access the contents of remote software application system 740. The service identifier may also include or be associated with a URL that addresses the remote software application system and to which the service identifier corresponds, thus allowing action design software application 900 to communicate with the remote software application system.

Thus, the service identifier may allow action design software application 900 to identify the remote software application system by way of which various remote software applications are accessible to workflows. In some cases, this service identifier may also be usable by workflows to access the APIs of remote software application system 740. Alternatively, the service identifier used by action design software application 900 may be different from the service identifiers usable by the workflows.

Based on or in response to obtaining the service identifier at block 907, action design software application 900 may be configured to request, from remote software application system 740, identification of available remote software applications, as indicated by arrow 908. The available remote software applications may be applications for which remote software application system 740 provides APIs that can be used to interact with the objects and functions of these applications. Based on or in response to the request at arrow 908, remote software application system 740 may be configured to provide identifiers of the available remote software applications, as indicated by arrow 910. In one example, the identifiers may take the form of a specification much like that shown in FIG. 8A, where each available remote software application is identified by a corresponding URL of a server that hosts the API therefor. In other examples, the identifiers may be provided in other ways, including, for example, as a list or array of names of the available remote software applications.

Based on or in response to reception of the identifiers at arrow 910, action design software application 900 may be configured to select therefrom a particular remote software application for which an interface is to be defined, as indicated by block 912. In some implementations, this selection may be automatic. For example, action design software application 900 may select the particular remote software application for which an interface has not yet been defined. In other implementations, the selection may be based at least in part on a selection made by a user. For example, action design software application 900 may provide a graphical user interface by way of which the available remote software applications are displayed and from which the particular remote software application is selected.

Based on or in response to selection of the particular remote software application at block 912, action design software application 900 may be configured to transmit, to remote software application system 740, a request for service identifiers for the particular remote software application, as indicated by arrow 914. These service identifiers, much like that obtained at block 907, may include username and password combinations, web tokens, or other authentication credentials. These service identifiers may allow workflows to interact with the APIs provided by remote software application system 740 and/or with the remote software applications. That is, the service identifiers may be requested by the APIs and/or by the remote software application prior to execution of the functions thereof.

The service identifiers may define the scope of functions and objects with which workflows may be able to interact. Namely, some service identifiers (e.g., those associated with administrator accounts) may allow access to a greater number of remote software applications, functions, and/or objects than other service identifiers (e.g., those associated with non-administrator users).

Based on or in response to reception of the request at arrow 914, remote software application system 740 may be configured to transmit, to action design software application 900, the requested service identifiers, as indicated by arrow

916. In one implementation, the service identifiers may be provided in the form of an API specification (e.g., in a "SECURITY" section thereof). In other implementations, the service identifiers may be provided as a list, array, or other data structure.

Action design software application 900 may also be configured to request a specification of the particular remote software application, as indicated by arrow 918. As discussed with respect to FIGS. 8A-8E, the specification may define standards, processes, and other rules for invoking the functions and interacting with the objects of the particular remote software application by way of remote software application system 740. Notably, a portion of the specification may be dictated by the manner in which the particular remote software application is configured to operate (e.g., the inputs necessitated by functions of the remote software application), while another portion may be dictated by the manner in which remote software application system 740 interacts with the particular remote software application on behalf of workflows (e.g., the manner in which APIs of remote software application system 740 operate).

Based on or in response to reception of the request at arrow 918, remote software application system 740 may be configured to transmit, to action design software application 900, the requested specification, as indicated by arrow 920. Notably, in some implementations, the operations of arrows 914 and 916 may be combined with the operations of arrow 918 and 920, respectively. This may be the case when, for example, the specification of the particular remote software application also defines therein the service identifiers usable to access the particular remote software application.

Based on or in response to reception of the service identifiers at arrow 916 and/or the specification at arrow 920, action design software application 900 may be configured to determine objects and functions exposed or made available to workflows by the particular remote software application. Specifically, the specification may be used by action design software application 900 to determine (i) one or more objects accessible by way of the particular remote software application and (ii) a plurality of functions of the particular remote software application invokable to interact with the one or more objects. For example, in the case of specification excerpts 802-808, the objects may include the object made up of OUTPUT_1-OUTPUT_3 (lines 29-36 of FIG. 8B) and OBJECT_4 (lines 14-22 of FIG. 8E), among other objects. The functions may include FUNCTION_1 (line 12 of FIG. 8B), FUNCTION_2 (line 1 of FIG. 8C), FUNCTION_3 (line 1 of FIG. 8D), and FUNCTION_4 (line 1 of FIG. 8E).

Based on or in response to determining the objects and functions at block 922, action design software application 900 may be configured to generate a plurality of actions that define an interface for the particular remote software application, as indicated by block 924. Each respective action of the plurality of actions, when executed, may be configured to invoke execution of one or more corresponding functions of the plurality of functions by transmitting a request to remote software application system 740. Remote software application system 740 may, in turn, transmit a modified version of this request to the particular remote software application, which may execute the one or more corresponding function in accordance with any inputs specified in the request. Remote software application system 740 may then receive, from the particular remote software application, the output of the one or more corresponding functions, which may be passed back to the respective action. Thus, the respective action may receive, in response to the request and by way of the remote software application system, an output of the one or more corresponding functions.

Each respective action may be defined to include (i) an input variable that corresponds to the input of the one or more corresponding functions and (ii) an output variable that corresponds to the output of the one or more corresponding functions. The input variable may be mapped to a parameter (e.g., URL resource path parameter, URL query parameter, HTTP header parameter, HTTP body parameter, and/or HTTP cookie parameter) of the request that gets transmitted to remote software application system 740 during execution of the workflow. Thus, when the respective action is executed, a value of the input variable may be included in the request according to this mapping. Similarly, the output variable may be mapped to a portion of a response from remote software application system 740 (e.g., the API thereof). Thus, reception of the response from remote software application system 740 may cause a value of the output of the one or more corresponding functions to be extracted from the response and stored in the output variable according to this second mapping.

Based on or in response to generation of the actions at block 924, action design software application 900 may be configured to request storage of the definition of the interface in persistent storage 902, as indicated by arrow 926. Based on or in response to reception of the request at arrow 926, persistent storage 902 may be configured to store therein the definition of the interface, as indicated by block 928. The stored interface may subsequently be retrieved by a workflow design software application to define one or more workflows that incorporate one or more of the actions of the interface. In some implementations, action design software application 900 may also be configured to designate a first subset of interfaces or actions as active, and a second subset as inactive. Such designation may be based on, for example, manual selection provided by way of a user interface of action design software application 900. Active actions and/or interfaces may be available for integration into workflows by way of the workflow design software application, while inactive actions and/or interfaces might not be available for this purpose.

Figure 9B:
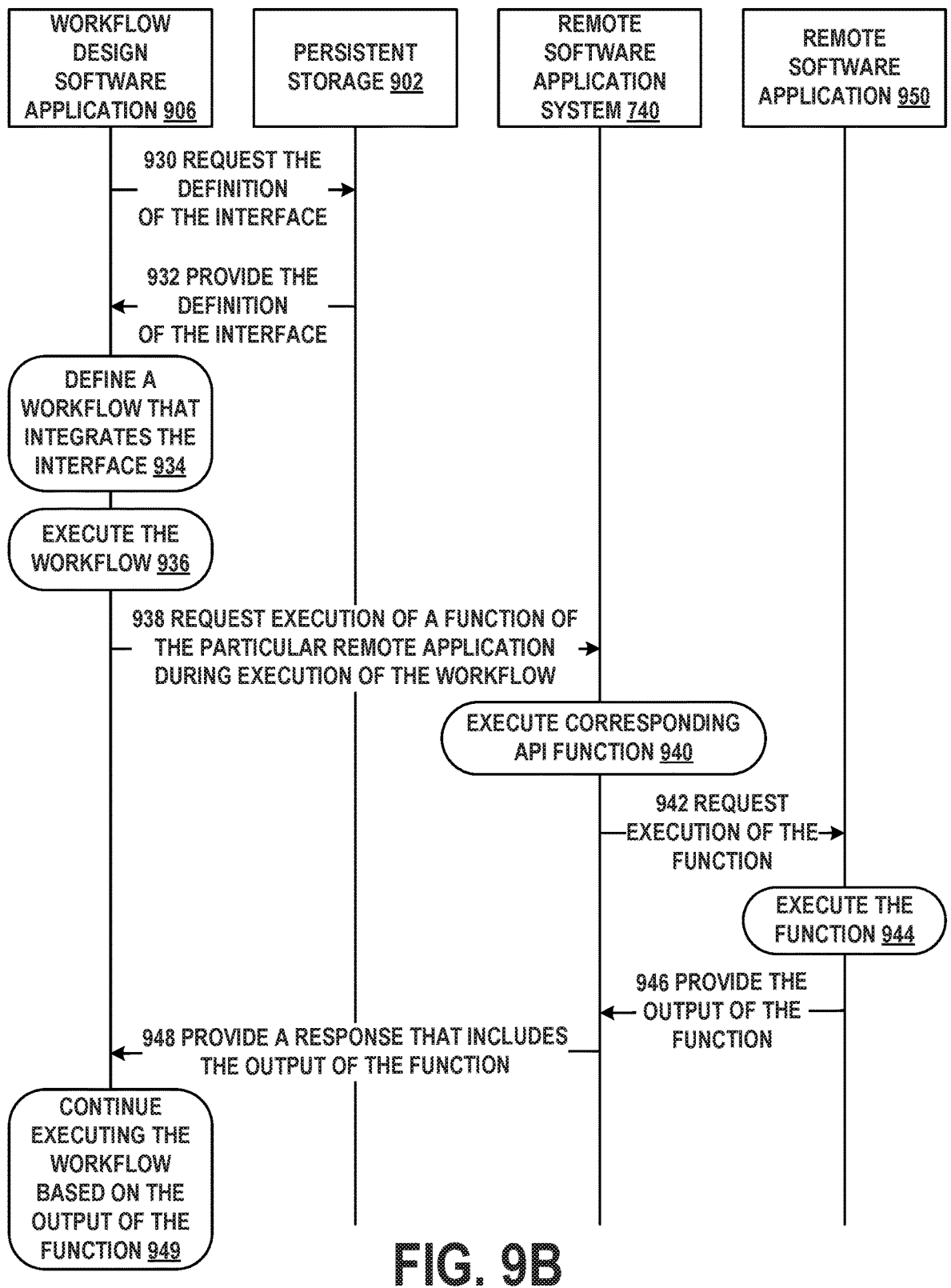

Accordingly, FIG. 9B illustrates a message diagram of operations involved in defining a workflow that utilizes the interface of a remote software application. Namely, workflow design software application 906 may be configured to define workflows that include one or more actions of the interface that has been defined by action design software application 900. Workflow design software application 906 may alternatively be referred to as a software-based workflow design tool, a workflow definition software application, or a workflow design software application. In one example, workflow design software application 906 may be disposed in or form part of a computational instance (e.g., computational instance 322) of remote network management platform 320. For example, workflow design software application 906 and action design software application 900 may be part of one software package or system.

Workflow design software application 906 may be configured to request, from persistent storage 902, the definition of an interface of remote software application 950, as indicated by arrow 930. In some cases, the request at arrow 930 may take the form of one or more actions of the interface, rather than the entirety of the interface (e.g., all the actions that make up the interface). This request may be generated, for example, in response to selection of the interface or an action thereof by way of a user interface provided by workflow design software application 906 during the course of defining a workflow. Based on or in response to reception of the request at arrow 930, persistent storage 902 may be configured to retrieve the definition of the interface and provide it to workflow design software application 906, as indicated by arrow 932.

In some implementations, action design software application 900 may be configured to periodically refresh each of the definitions of the interfaces. Namely, action design software application 900 may be configured to obtain updated versions of the specifications, identify and changes to the objects and/or functions, and update any affected actions to generate updated interfaces. Thus, in some cases, the definition obtained at arrow 932 may represent a version of the interface that was updated one or more times since its initial generation.

Alternatively or additionally, in some cases, retrieval of a particular interface definition from persistent storage 902 by workflow design software application 906 may trigger the updating of the interface. Namely, before persistent storage provides the definition at arrow 932, persistent storage 902 may transmit to action design software application 900 an indication that this particular interface is requested to be integrated into a workflow. Based on or in response to this indication, action design software application 900 may be configured to obtain an updated specification for remote software application 950 corresponding to this interface, identify any changes in the objects and/or functions based on the updated specification, and generate an updated interface based on these changes. Action design software application 900 may then request storage of the definition of this updated interface in persistent storage 902. Persistent storage 902 may thus provide, to workflow design software application 906, the definition of the updated interface at arrow 932, rather than providing an out-of-date definition.

Based on or in response to reception of the definition at arrow 932, workflow design software application 906 may be configured to define a workflow that integrates therein the interface, as indicated by block 934. Such a workflow may use one or more actions of the interface to invoke execution of particular functions of remote software application 950 in order to interact with corresponding objects provided thereby. The one or more actions of the interface may receive as input values determined by other parts of the workflow and may allow outputs of these actions to be used by yet further parts of the workflow. Thus, the interface of remote software application 950 may allow the workflow to treat remote software application 950 as if it were executed locally alongside the workflow, although remote software application 950 may actually be executed by other remote computing systems.

Based on or in response to definition of the workflow at block 934 and/or the occurrence of a particular trigger specified within the workflow, workflow definition application 906 (or another software application) may be configured to execute the workflow, as indicated by block 936. When execution of the workflow reaches an action of the interface of remote software application 950, workflow design software application 906 may be configured to transmit, to remote software application system 740, a request for execution of a function of remote software application 950, as indicated by arrow 938. The request may include therein input values for the function, as dictated by the corresponding action.

Based on or in response to reception of the request at arrow 938, remote software application system 740 may be configured to execute an API function that has been specified by the request at arrow 938, as indicated by block 940. Execution of this API function may transform request 938 into a format or state that is compatible with remote software application 950. In one example, assuming remote software application 950 corresponds to remote software application 700 of FIG. 7, the request at arrow 938 may specify API function 744 of API 742, thus causing remote software application system 740 to execute API function 744 to effectuate execution of function 706. Notably, the manner in which the function is specified at arrow 938 may depend on how remote software application system 740 structures and/or formats the specifications it provides to define the attributes of available remote software applications.

Execution of the corresponding API function at block 940 may cause remote software application system 740 to transmit, to remote software application 950, a request for execution of the function integrated into the workflow, as indicated by arrow 942. Based on or in response to reception of the request at arrow 942, remote software application 950 may be configured to execute the specified function, as indicated by block 944. Based on or in response to execution of the function at block 944, remote software application 950 may be configured to provide, to remote software application system 740, the output of the function, as indicated by arrow 946.

Based on or in response to reception of the output of the function at arrow 946, remote software application system 740 may be configured to provide, to workflow design software application 906, a response that includes the output of the function, as indicated by arrow 948. Notably, since the request at arrow 938 may differ in format from that at arrow 942, the response at arrow 948 may similarly involve a different format than that at arrow 946. This transformation between different formats may be handled by the corresponding API function provided by remote software application system 740. Based on or in response to reception of the response at arrow 948, workflow design software application 906 may continue executing the workflow based on the output of the function, as indicated by block 949. Notably, the workflow may invoke other functions of remote software application 950 and/or other functions of other remote software applications provided by way of remote software application system 740.

IX. Example Workflow

Figure 10:
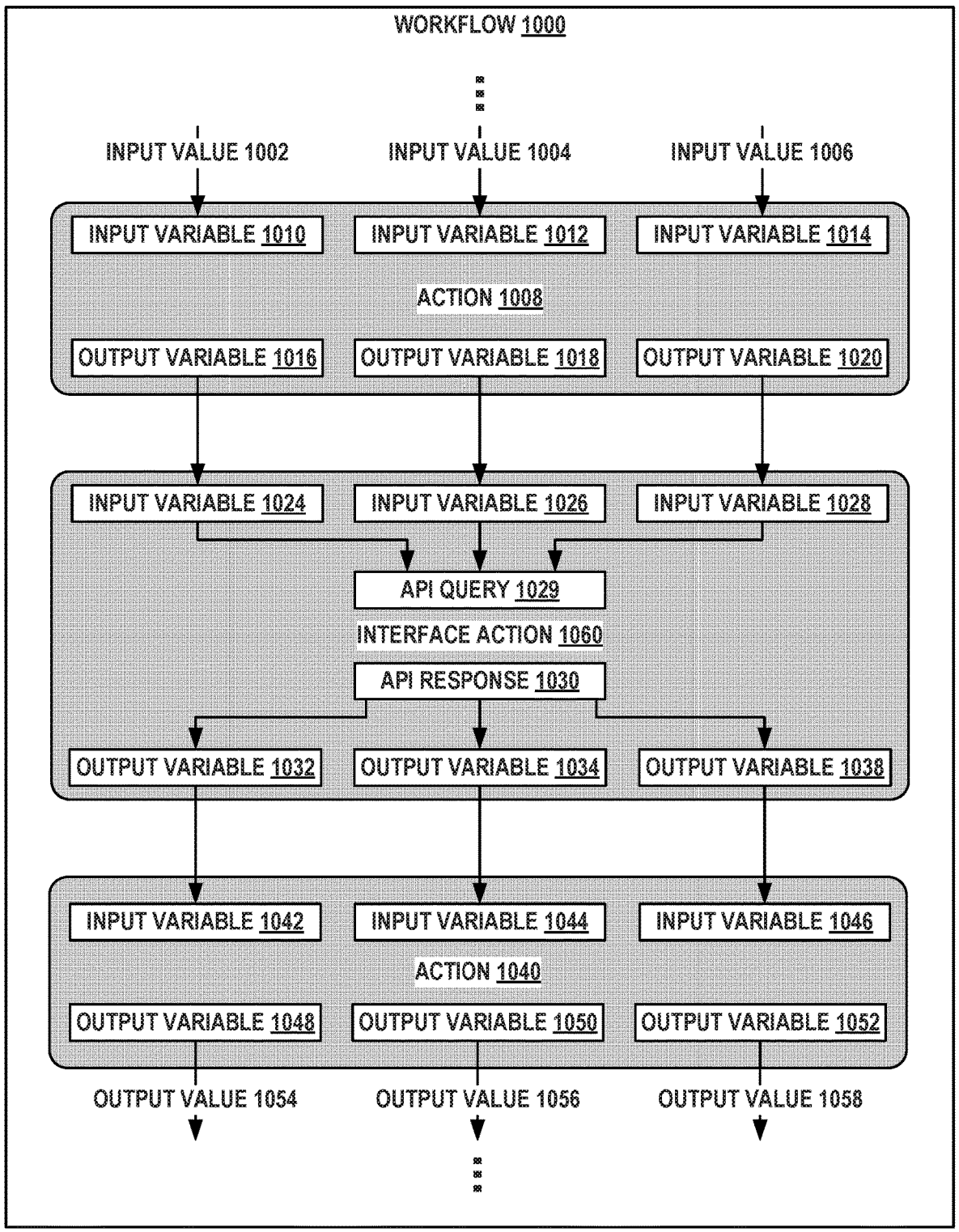
FIG. 10 depicts a workflow, in accordance with example embodiments.

FIG. 10 illustrates a diagrammatic representation of workflow 1000. Workflow 1000 includes integrated therein interface action 1060 which invokes a function of a remote software application, and actions 1008 and 1040, which might not invoke functions of remote software applications. The variables of actions 1060, 1008, and 1040 are shown interconnected to illustrate an example flow of data through workflow 1000. Notably, in some implementations, workflow 1000 may include additional actions, as indicated by the ellipses, or fewer actions. When an action is integrated and/or intended to be integrated into a workflow, the action may alternatively be referred to as a workflow action.

Action 1008 includes input variables 1010, 1012, and 1014. During execution of workflow 1000, input variables 1010, 1012, and 1014 of action 1008 are assigned input values 1002, 1004, and 1006, respectively. Input values 1002, 1004, and 1006 may represent, among other possibilities, the outputs of other actions in workflow 1000, user input, or data retrieved from databases. Action 1008 additionally includes output variables 1016, 1018, and 1020, each of which represents one or more of input values 1002, 1004, or 1006 processed according to the logic defined by action 1008. For example, output variable 1020 may store a modified version of a string (e.g., a name, reformatted as {first name}, {last name}) retrieved from a database and provided to action 1008 as input value 1002 (e.g., the name, originally formatted as {last name}, {middle initial}, {first name}). The output variables 1016, 1018, and 1020 are connected to the input variables 1024, 1026, and 1028, respectively, of interface action 1060, thus indicating how the values of these variables are propagated through the workflow.

Interface action 1060 is configured to generate API query 1029 based on the values of input variables 1024, 1026, and 1028. API query 1029 may be generated according to rules defined by the specification of the remote software application corresponding to interface action 1060. API query 1029 may be generated to include a connection alias that assists with identifying a specific remote application system to be invoked by API query 1029 and authentication credentials corresponding to this specific remote application system. By using connection aliases, system-specific connection information may be decoupled from the definitions of actions (e.g., action 1060), thus allowing actions to, for example, use a plurality of different authentication credentials. API query 1029 is transmitted to the remote software application system (e.g., 740) to invoke execution of the corresponding API function thereof. The API function, in turn, requests execution of the corresponding function of the remote software application and receives therefrom its output.

Similarly, interface action 1060 is configured to receive API response 1030 from the remote software application system. API response 1030 includes therein the output values of the remote software application function invoked by API query 1029. These output values are mapped by interface action 1060 to corresponding output variables 1032, 1034, and 1038.

The values of output variables 1032, 1034, and 1038 are, in turn, assigned and propagated to input variables 1042, 1044, and 1046 of action 1040. In some cases, API response 1030 may include output values that are not passed from interface action 1060 to action 1040. For example, only some portions of an object retrieved by interface action 1060 from the remote software application might be used by the rest of workflow 1000. Action 1040 processes input variables 1042, 1044, and 1046 to generate output values 1054, 1056, and 1058 of output variables 1048, 1050, and 1052, respectively.

Thus, the integration of interface action 1060 into a workflow allows interface action 1060 to operate on the outputs of action 1008 and allows action 1040 to operate on the outputs of interface action 1060. In other words, interface action 1060 allows the corresponding function of the remote software application to be invoked as if it were part of the same computing system as actions 1008 and 1040. Additionally, interface action 1060 is automatically defined by the action design software application, programming workflow 1000 generally only involves defining the connections between the input and output variables of actions 1060, 1008, and 1040. Thus, the workflow designer might not have to know many details, if any, regarding the API function and/or remote software application function invoked by interface action 1060.

X. Example Operations

Figure 11:
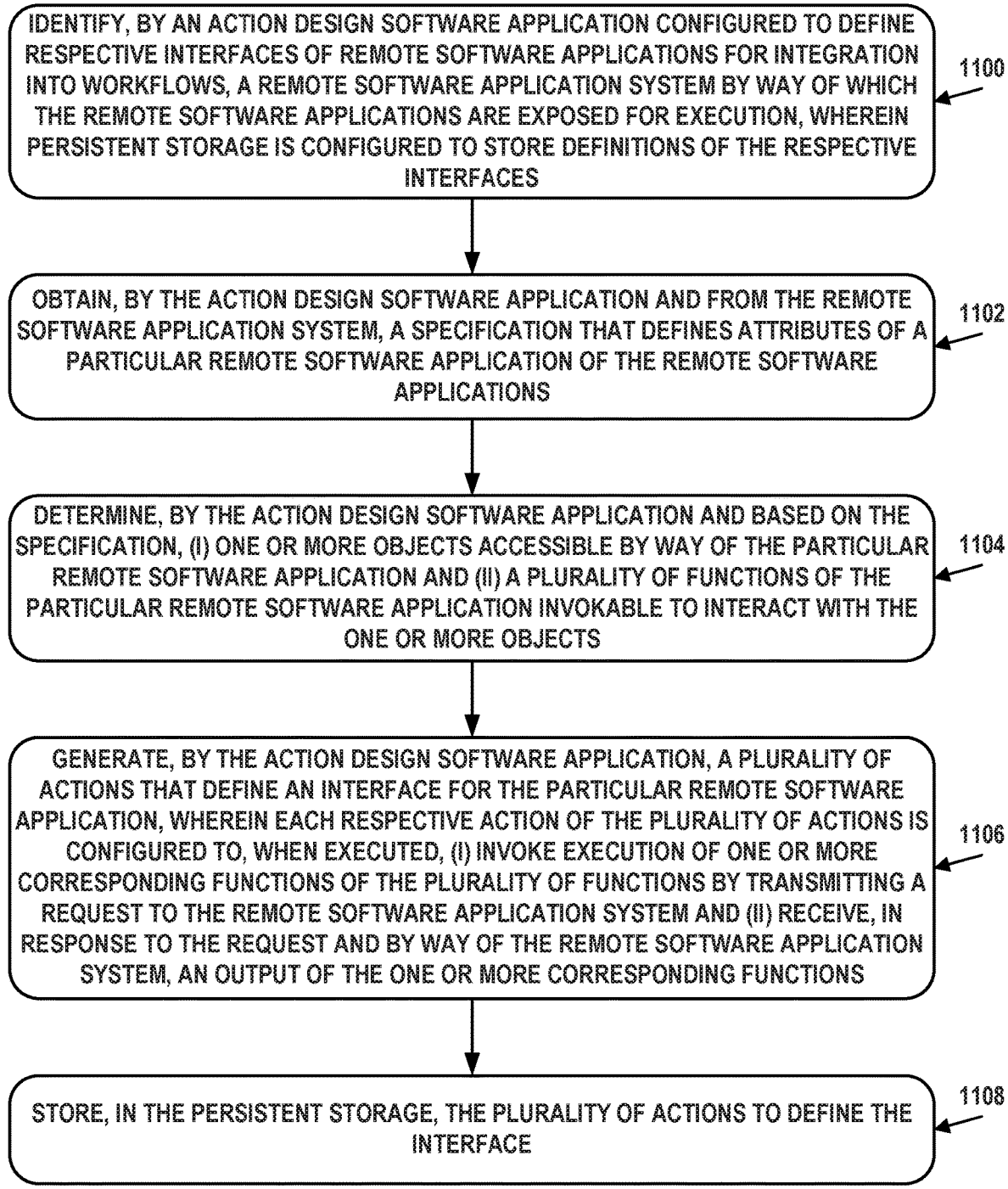
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 involves identifying, by an action design software application configured to define respective interfaces of remote software applications for integration into workflows, a remote software application system by way of which the remote software applications are exposed for execution. Persistent storage may be configured to store definitions of the respective interfaces.

Block 1102 involves obtaining, by the action design software application and from the remote software application system, a specification that defines attributes of a particular remote software application of the remote software applications.

Block 1104 involves determining, by the action design software application and based on the specification, (i) one or more objects accessible by way of the particular remote software application and (ii) a plurality of functions of the particular remote software application invokable to interact with the one or more objects.

Block 1106 involves generating, by the action design software application, a plurality of actions that define an interface for the particular remote software application. Each respective action of the plurality of actions may be configured to, when executed, (i) invoke execution of one or more corresponding functions of the plurality of functions by transmitting a request to the remote software application system and (ii) receive, in response to the request and by way of the remote software application system, an output of the one or more corresponding functions.

Block 1108 involves storing, in the persistent storage, the plurality of actions to define the interface.

In some embodiments, the remote software applications may be hosted by a plurality of different remote computing systems. The remote software application system may be communicatively connected to each of the different remote computing systems to expose the remote software applications for execution on behalf of the workflows.

In some embodiments, the particular remote software application may be accessible by way of an API provided by the remote software application system. Execution of each respective function of the plurality of functions may be invokable by way of a corresponding API function of the API. The specification may define a plurality of functions of the API. Each respective action may be configured to, when executed by the workflows, invoke execution of the one or more corresponding functions by transmitting the request to the corresponding API function. The remote software application system may be configured to cause the particular remote software application to execute the one or more corresponding functions in response to reception of the request.

In some embodiments, identifying the remote software application system may include obtaining a URL that addresses the remote software application system and obtaining, by way of the URL, a list of the remote software applications that are exposed by way of the remote software application system for execution on behalf of the workflows. For each respective remote software application of the remote software applications, a list of one or more service identifiers may be obtained that allow the workflows to invoke execution of the plurality of functions of the respective remote software application. Each respective action of the plurality of actions may be configurable to use a particular service identifier of the one or more service identifiers to invoke execution of the one or more corresponding functions.

In some embodiments, generating the plurality of actions that define the interface for the particular remote software application may include (i) enabling a first portion of the plurality of actions such that actions of the first portion are available for integration into the workflows and (ii) disabling a second portion of the plurality of actions such that actions of the second portion are not available for integration into the workflows.

In some embodiments, the attributes defined by the specification may include, for each respective function of the plurality of functions, (i) a URL of an API of the remote software application system by way of which the respective function is exposed for execution, (ii) an input of the respective function, and (iii) an output of the respective function. Generating the plurality of actions that define the interface may include generating, for each respective action, (i) an input variable of the respective action that corresponds to the input of the one or more corresponding functions and (ii) an output variable of the respective action that corresponds to the output of the one or more corresponding functions. For each respective action, a first mapping may be determined between the input variable and a parameter of the request transmitted to the remote software application system. Execution of the respective action may invoke execution of the respective function by transmitting the request to the URL of the API. The request may include therein a value of the input variable according to the first mapping. For each respective action, a second mapping may be determined between the output variable and a response from the API. The response may be to the request. Reception, from the API, of the response may cause a value of the output of the one or more corresponding functions to be stored in the output variable according to the second mapping.

In some embodiments, the parameter of the request transmitted to the API may include at least one of: (i) a URL resource path parameter that identifies a specific resource provided by a server device that hosts the API, (ii) a URL query parameter comprising a key and value pair, (iii) a header parameter to be provided to the API as an HTTP header of the request, (iv) a body parameter to be provided to the API as part of an HTTP body of the request, or (v) a cookie parameter to be provided to the API within an HTTP cookie of the request.

In some embodiments, a workflow design software application may be configured to define the workflows that use the respective interfaces. The workflow design software application may be configured to receive selection of a first action and a second action to define a workflow. The second action may precede the first action in the workflow. The first action may be selected from the plurality of actions of the interface for the particular remote software application. The workflow design software application may also be configured to receive an assignment of an output variable of the second action to an input variable of the first action. The workflow design software application may additionally be configured to generate a connection between (i) the output variable of the second action and (ii) the input variable of the first action. A value of the output variable of the second action may be passed from the second action to the input variable of the first action during execution of the workflow.

In some embodiments, a workflow design software application may be configured to define the workflows that use the respective interfaces. The workflow design software application may be configured to receive selection of a first action and a second action to define a workflow. The first action may precede the second action in the workflow. The first action may be selected from the plurality of actions of the interface for the particular remote software application. The workflow design software application may also be configured to receive an assignment of an output variable of the first action to an input variable of the second action. The workflow design software application may additionally be configured to generate a connection between (i) the output variable of the first action and (ii) the input variable of the second action. A value of the output variable of the first action may be passed from the first action to the input variable of the second action during execution of the workflow.

In some embodiments, a workflow design software application may be configured to define a workflow by receiving selection of a first action from the plurality of actions of the interface. The action design software application may be configured to, based on the workflow design software application receiving the selection of the first action, obtain, from the remote software application system, an updated specification of the particular remote software application that represents one or more updates to (i) the one or more objects or (ii) the plurality of functions. The action design software application may also be configured to update the first action based on the updated specification prior to integration of the first action into the workflow. The first action as updated may be stored in the persistent storage for integration of the first action into the workflow by the workflow design software application.

In some embodiments, the action design software application may be configured to periodically obtain, from the remote software application system, an updated specification of the particular remote software application that represents one or more updates to (i) the one or more objects or (ii) the plurality of functions. The action design software application may also be configured to update the plurality of actions based on the updated specification and store, in the persistent storage, the plurality of actions as updated.

In some embodiments, a workflow design software application may be configured to define a workflow that uses the respective interfaces of at least two different remote software applications.

In some embodiments, identifying the remote software application system may include identifying a plurality of available remote software application systems each configured to expose a different set of remote software applications for execution. The remote software application system may be selected from the plurality of available remote software application systems based on a managed network maintaining one or more service identifiers for the remote software application system. The workflows may be defined for execution on behalf of the managed network.

In some embodiments, the one or more objects may each comprise a data structure arranged in a hierarchy of key and value pairs.

In some embodiments, the plurality of functions may be configured to interact with the one or more objects by creating the one or more objects, modifying the one or more objects, or deleting the one or more objects.

XI. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
persistent storage configured to store definitions of respective interfaces of remote software applications for integration into workflows;
one or more processors; and
an action design software application configured to define the respective interfaces, wherein the action design software application is configured to perform, by way of the one or more processors, operations comprising:
identifying a remote software application system from a plurality of available remote software application systems by using a particular service identifier of one or more service identifiers, on which the remote software applications are exposed for execution;
obtaining, from the remote software application system, a specification that defines attributes of a particular remote software application of the remote software applications;
determining, based on the specification, (i) one or more objects accessible by way of the particular remote software application and (ii) a plurality of functions of the particular remote software application invokable to interact with the one or more objects;
generating a plurality of actions that define an interface for the particular remote software application by:
enabling a first portion of the plurality of actions such that actions of the first portion are available for integration into the workflows;
disabling a second portion of the plurality of actions such that actions of the second portion are not available for integration into the workflows;
transmitting, to the remote software application system, a request for executing one or more functions of the plurality of functions based on the first portion of the plurality of actions; and
receiving, from the remote software application system, an output of the one or more functions based on the request; and
storing, in the persistent storage, the plurality of actions to define the interface.

2. The system of claim 1, wherein the remote software applications are hosted by a plurality of different remote computing systems, and wherein the remote software application system is communicatively connected to each of the different remote computing systems to expose the remote software applications for execution on behalf of the workflows.

3. The system of claim 1, wherein the particular remote software application is accessible by way of an application programming interface (API) provided by the remote software application system, and wherein execution of each respective function of the plurality of functions is invokable by way of a corresponding API function of the API, wherein the specification defines a plurality of API functions of the API, wherein each respective action is configured to, when executed by the workflows, invoke execution of the one or more corresponding functions by transmitting the request to the corresponding API function, and wherein the remote software application system is configured to cause the particular remote software application to execute the one or more corresponding functions in response to reception of the request.

4. The system of claim 1, wherein identifying the remote software application system comprises:
  obtaining a uniform resource locator (URL) that addresses the remote software application system;
  obtaining, by way of the URL, a list of the remote software applications that are exposed by way of the remote software application system for execution on behalf of the workflows; and
  for each respective remote software application of the remote software applications, obtaining a list of the one or more service identifiers that allow the workflows to invoke execution of the plurality of functions of the respective remote software application, wherein each respective action of the plurality of actions is configurable to use the particular service identifier of the one or more service identifiers to invoke execution of the one or more corresponding functions.

5. The system of claim 1, wherein the attributes defined by the specification comprise, for each respective function of the plurality of functions, (i) a uniform resource locator (URL) of an application programming interface (API) of the remote software application system by way of which the respective function is exposed for execution, (ii) an input of the respective function, and (iii) an output of the respective function, and wherein generating the plurality of actions that define the interface comprises:
  generating, for each respective action, (i) an input variable of the respective action that corresponds to the input of the one or more corresponding functions and (ii) an output variable of the respective action that corresponds to the output of the one or more corresponding functions;
  determining, for each respective action, a first mapping between the input variable and a parameter of the request transmitted to the remote software application system, wherein execution of the respective action invokes execution of the respective function by transmitting the request to the URL of the API, and wherein the request includes therein a value of the input variable according to the first mapping; and
  determining, for each respective action, a second mapping between the output variable and a response from the API, wherein the response is to the request, and wherein reception, from the API, of the response causes a value of the output of the one or more corresponding functions to be stored in the output variable according to the second mapping.

6. The system of claim 5, wherein the parameter of the request transmitted to the API comprises at least one of: (i) a URL resource path parameter that identifies a specific resource provided by a server device that hosts the API, (ii) a URL query parameter comprising a key and value pair, (iii) a header parameter to be provided to the API as a hypertext transfer protocol (HTTP) header of the request, (iv) a body parameter to be provided to the API as part of an HTTP body of the request, or (v) a cookie parameter to be provided to the API within an HTTP cookie of the request.

7. The system of claim 5, comprising:
  a workflow design software application configured to define the workflows that use the respective interfaces, wherein the workflow design software application is configured to perform, by way of the one or more processors, operations comprising:
    receiving selection of a first action and a second action to define a workflow, wherein the second action precedes the first action in the workflow, and wherein the first action is selected from the plurality of actions of the interface for the particular remote software application;
    receiving an assignment of an output variable of the second action to an input variable of the first action; and
    generating a connection between (i) the output variable of the second action and (ii) the input variable of the first action, wherein a value of the output variable of the second action is passed from the second action to the input variable of the first action during execution of the workflow.

8. The system of claim 5, comprising:
  a workflow design software application configured to define the workflows that use the respective interfaces, wherein the workflow design software application is configured to perform, by way of the one or more processors, operations comprising:
    receiving selection of a first action and a second action to define a workflow, wherein the first action precedes the second action in the workflow, and wherein the first action is selected from the plurality of actions of the interface for the particular remote software application;
    receiving an assignment of an output variable of the first action to an input variable of the second action; and
    generating a connection between (i) the output variable of the first action and (ii) the input variable of the second action, wherein a value of the output variable of the first action is passed from the first action to the input variable of the second action during execution of the workflow.

9. The system of claim 1, comprising a workflow design software application configured to define a workflow by receiving selection of a first action from the plurality of actions of the interface, wherein the operations comprise:
  based on the workflow design software application receiving the selection of the first action, obtaining, from the remote software application system, an updated specification of the particular remote software application that represents one or more updates to (i) the one or more objects or (ii) the plurality of functions;
  updating the first action based on the updated specification prior to integration of the first action into the workflow; and
  storing, in the persistent storage, the first action as updated for integration of the first action into the workflow by the workflow design software application.

10. The system of claim 1, wherein the operations comprise:
  periodically obtaining, from the remote software application system, an updated specification of the particular remote software application that represents one or more updates to (i) the one or more objects or (ii) the plurality of functions;

updating the plurality of actions based on the updated specification; and storing, in the persistent storage, the plurality of actions as updated.

11. The system of claim 1, comprising:
a workflow design software application configured to define a workflow that uses the respective interfaces of at least two different remote software applications.

12. The system of claim 1, wherein identifying the remote software application system comprises:
identifying the plurality of available remote software application systems each configured to expose a different set of remote software applications for execution; and
selecting, from the plurality of available remote software application systems, the remote software application system based on a managed network maintaining the one or more service identifiers for the remote software application system, wherein the workflows are defined for execution on behalf of the managed network.

13. The system of claim 1, wherein the one or more objects each comprise a data structure arranged in a hierarchy of key and value pairs.

14. The system of claim 1, wherein the plurality of functions are configured to interact with the one or more objects by creating the one or more objects, modifying the one or more objects, or deleting the one or more objects.

15. A computer-implemented method comprising:
identifying, by an action design software application configured to define respective interfaces of remote software applications for integration into workflows, a remote software application system from a plurality of remote software application system by using a particular service identifier or one or more service identifiers, on which the remote software applications are exposed for execution, wherein persistent storage is configured to store definitions of the respective interfaces;
obtaining, by the action design software application and from the remote software application system, a specification that defines attributes of a particular remote software application of the remote software applications;
determining, by the action design software application and based on the specification, (i) one or more objects accessible by way of the particular remote software application and (ii) a plurality of functions of the particular remote software application invokable to interact with the one or more objects;
generating, by the action design software application, a plurality of actions that define an interface for the particular remote software application by:
enabling a first portion of the plurality of actions such that actions of the first portion are available for integration into the workflows;
disabling a second portion of the plurality of actions such that actions of the second portion are not available for integration into the workflows;
transmitting, to the remote software application system, a request for executing one or more functions of the plurality of functions based on the first portion of the plurality of actions; and
receiving, from the remote software application system, an output of the one or more functions based on the request; and
storing, in the persistent storage, the plurality of actions to define the interface.

16. The computer-implemented method of claim 15, wherein the particular remote software application is accessible by way of an application programming interface (API) provided by the remote software application system, and wherein execution of each respective function of the plurality of functions is invokable by way of a corresponding API function of the API, wherein the specification defines a plurality of API functions of the API, wherein each respective action is configured to, when executed by the workflows, invoke execution of the one or more corresponding functions by transmitting the request to the corresponding API function, and wherein the remote software application system is configured to cause the particular remote software application to execute the one or more corresponding functions in response to reception of the request.

17. The computer-implemented method of claim 15, wherein the attributes defined by the specification comprise, for each respective function of the plurality of functions, (i) a uniform resource locator (URL) of an application programming interface (API) of the remote software application system by way of which the respective function is exposed for execution, (ii) an input of the respective function, and (iii) an output of the respective function, and wherein generating the plurality of actions that define the interface comprises:
generating, for each respective action, (i) an input variable of the respective action that corresponds to the input of the one or more corresponding functions and (ii) an output variable of the respective action that corresponds to the output of the one or more corresponding functions;
determining, for each respective action, a first mapping between the input variable and a parameter of the request transmitted to the remote software application system, wherein execution of the respective action invokes execution of the respective function by transmitting the request to the URL of the API, and wherein the request includes therein a value of the input variable according to the first mapping; and
determining, for each respective action, a second mapping between the output variable and a response from the API, wherein the response is to the request, and wherein reception, from the API, of the response causes a value of the output of the one or more corresponding functions to be stored in the output variable according to the second mapping.

18. The computer-implemented method of claim 15, wherein a workflow design software application is configured to define a workflow by receiving selection of a first action from the plurality of actions of the interface, and wherein the method comprises:
based on the workflow design software application receiving the selection of the first action, obtaining, from the remote software application system, an updated specification of the particular remote software application that represents one or more updates to (i) the one or more objects or (ii) the plurality of functions;
updating the first action based on the updated specification prior to integration of the first action into the workflow; and
storing, in the persistent storage, the first action as updated for integration of the first action into the workflow by the workflow design software application.

19. An article of manufacture including a non-transitory computer-readable medium, having stored thereon program instructions that, upon execution by a computing system, cause the computing system to perform operations comprising:

identifying a remote software application system from a plurality of available remote software application systems by using a particular service identifier of one or more service identifiers, on which remote software applications are exposed for execution, wherein persistent storage is configured to store definitions of respective interfaces of the remote software applications for integration into workflows;

obtaining, from the remote software application system, a specification that defines attributes of a particular remote software application of the remote software applications;

determining, based on the specification, (i) one or more objects accessible by way of the particular remote software application and (ii) a plurality of functions of the particular remote software application invokable to interact with the one or more objects;

generating a plurality of actions that define an interface for the particular remote software application by:

enabling a first portion of the plurality of actions such that actions of the first portion are available for integration into the workflows;

disabling a second portion of the plurality of actions such that actions of the second portion are not available for integration into the workflows;

transmitting, to the remote software application system, a request for executing one or more functions of the plurality of functions based on the first portion of the plurality of actions; and receiving, from the remote software application system, an output of the one or more functions based on the request; and storing, in the persistent storage, the plurality of actions to define the interface.

20. The article of manufacture of claim 19, wherein the program instructions define:

a workflow design software application configured to define a workflow that uses the respective interfaces of at least two different remote software applications.

* * * * *